United States Patent [19]

Eustis et al.

[11] 4,433,377

[45] Feb. 21, 1984

[54] DATA PROCESSING WITH FORMAT VARYING

[76] Inventors: Mary S. Eustis; Augustus W. Eustis, both of 6 Raymond St., Lexington, Mass. 02173

[21] Appl. No.: 278,625

[22] Filed: Jun. 29, 1981

[51] Int. Cl.³ .............................................. G06F 7/22
[52] U.S. Cl. .................................................. 364/200
[58] Field of Search ............................... 364/200, 900

[56] References Cited

U.S. PATENT DOCUMENTS

| | | | |
|---|---|---|---|
| 2,764,750 | 9/1956 | Wright et al. | 364/900 |
| 3,571,808 | 3/1971 | Washizuka | 364/200 |
| 3,654,621 | 4/1972 | Bock et al. | 364/200 |
| 3,771,133 | 11/1973 | Kashio | 364/900 |
| 3,824,561 | 7/1974 | Wolf | 364/200 |
| 3,905,022 | 9/1975 | Klosky et al. | 364/900 |
| 3,956,736 | 5/1976 | Jacques et al. | 364/200 |
| 4,021,782 | 5/1977 | Hoerning | 364/900 |
| 4,027,288 | 5/1977 | Barton et al. | 364/900 |
| 4,037,205 | 7/1977 | Edelberg et al. | 364/900 |
| 4,103,329 | 7/1978 | Davis et al. | 364/200 |

*Primary Examiner*—Jerry Smith
*Assistant Examiner*—Jameson Lee
*Attorney, Agent, or Firm*—Charles Hieken

[57] ABSTRACT

There are sequencers and format registers which create variable length digital data signal fields and associated field attributes, both with the fields and operations performed on the fields in a random access memory with a central processing unit having comprehensive processing capability, including arithmetic, field and record looping, compare, move and jump, look-up and disk read/write functions, I/O keyboard, display, print types of processing. The sequencers and associated format registers allow and manage comprehensive association of attributes with variable length digital data signal fields.

4 Claims, 23 Drawing Figures

LEVELS OF FORMAT AND FIELD RECORD REGISTER

FORMAT REGISTERS AND FORMAT SELECT & ENABLE LOGIC

CONTROL UNIT 24 — DATA FORMATTER

FORMAT AND DATA REGISTERS

FORMAT REGISTER SELECT FLIP FLOPS

ACTIVE STATUS REGISTER-(ASR)-DATA IN

ACTIVE STATUS REGISTER-(ASR)-DATA OUT 202

ACTIVE STATUS REGISTER (ASR) - DATA OUT

FIELD REGISTER SEQUENCER

REGISTER LOCATION DECODE

REGISTER ADDRESS SELECT
FOR SET UP PURPOSES

I/O REGISTER SELECT

ENABLE LOGIC 279

REGISTER SELECT LOGIC 279

DATA PROCESSING WITH FORMAT VARYING

BACKGROUND OF THE INVENTION

The present invention relates in general to data processing and more particularly to an electronic control unit that is used to format data for storage and I/O. This formatting is done by creating multiple levels of formats that hold multiple characteristics of fields and subfields of data simultaneously. The control unit manages interactive multilevel data formatting by keeping the data strings separate from the multiple levels of formats. Data itself is never managed as pieces that are segmented into two dimensional lines and rows, it is managed linearly, while the formats manage any two dimensional formatting whether for horizontal and vertical calculations, horizontal and vertical displays, display of different formats of the same data on a CRT and a printer, or other combination of n-dimensional formatting.

The invention provides an economical compact powerful data processing system that can be operated by relatively unskilled personnel.

The invention provides electronic means which create variable length data registers in RAM and permit N-dimensional formatting of data. It consists of electronic registers containing two levels of data formats and one level of field data that are accessed with counters. By assigning permanent numbers to the formats, variable length field data can be located electronically, independent of the instruction operations performed on that data.

Operations in the interactive registers create an unlimited succession of repeated operations on individual atoms of the data characters. This means that there is no inherent limitation imposed upon the operations by any fixed data representation, and the same operations can be successfully performed on completely different data elements.

State of the art means of implementing variable length data fields use a program counter that implements a program, moving data from memory to a set of general purpose registers, selecting registers and thereafter acting on the data in the operations register. The invention implements variable length data fields with new combinations of registers and counters that create interactive registers addressed from format information contained in status registers. Data is operated on in RAM; the instruction set moves data according to the operations, one character at a time. The status registers can structure data because operations on data are independent of the data definition.

State of the art program techniques for variable length formatting use a software counter to specify field length and act as a field terminator during program operations where data is moved into registers of or buffers. The invention replaces this program technique with hardware means to specify variable length fields by providing for mixed place field formats and fixed place operation formats in registers which input into a hardware counter which acts as a terminator. Data is operated on in place or in memory or in other variable length RAM registers during operations. The fixed data definition formats of the invention are independent of the program operations. The locations and characteristics of the fields are kept in the formats which are stored in independent or dependent index registers. The data from a field is never moved into a fixed length register for operations, it is output from RAM, making instruction coding a matter of stringing together independent operations that correspond largely two what an operator wants to do with data rather than with what register the machine expects to see data in for an operation.

State of the art hardware provides index registers containing address byte/s specifying a displacement from a base, used to point to a region in memory from which data is to be stored or retrieved, particularly simplifying access to tables and strings of fixed length data. The invention provides a novel combination of an independent index register—the display register and dependent index register—the master register. In combination they are used to create a variable register for data where the data can be used in RAM as though it has been moved to an operations register, not only greatly simplifying the program construction, but also creating a true variable length register. This creates a more flexible machine, along with changing programming to entry of field definitions, entry of all aspects of one operation, then all aspects of another operation, and so forth until all operations have been entered sequentially.

Simultaneous formatting of data for storage and I/O requires that data fields be made to appear that they are next to each other, even though they are really not, without actually moving the data around since the data cannot physically be in two places at once.

The state of the art means for managing this problem consists of hardware used in combination with software branches and conditional logic that return back to a named sector after processing one line of the branch. With branches, the user may manage first one section of the data, and then the next. For example, in the state of the art means, a CRT screen and a printer, both to be formatted with data in two dimensions on a grid would use a program to segment the data for the CRT grid and then use a different program to segment the data for the printer grid, assuming that the grids were different. That is, to change a location of the data on the grid, the data has to be resegmented for that unique grid. The separate grids for each device have no correlation with each other. Programming is after all, a way to move data in and out of the various configurations so it can be formatted.

In the new control unit according to the invention, to reformat the data, the format is changed, but the data is not relocated, nor is the data segmented in any manner other than how it came into the unit in the first place. The invention makes it possible to format that data so that it appears to the output devices as though the data is in two places at the same time, even though the data has never moved and never been segmented. This logic provides data structure flexibility far beyond creating grid structures linearly. The advantage of eliminating branches and conditional decision logic is that the invention replaces them with a set-up process that replaces programming.

SUMMARY OF THE INVENTION

There is an independent index display register containing a counter in the display format sequencer that steps the system through instructions in the display format register that contains the instructions. A jump to another location is possible by setting the counter. Instructions are decoded in the decode unit.

Associated operations and references to field definitions in the dependent index master register make it more than a program counter. The display format instruction has a counter that selects one or several master field formats stored in the master format registers. The instructions contain important, or attributes information about an operation, making that operation largely independent of the other instructions; it may include detailed descriptions of up to three data fields, jump, compare, calculations, and I/O information such as lines and spaces between fields. A particular master format is decoded from the ASR data in by the control unit, determining length, starting location, format type, alpha, numeric, decimal digits, and/or other relevant descriptive information. While only one dependent master index register is shown in the present disclosure, this is not meant to limit the number of dependent index registers that may be implemented in a particular application of the invention. It is the dependent registers that provide N-dimensional formatting because a particular format is decoded in each master register. For example, in a network, several master registers would hold the field characteristics of each system, or multiple characteristics of one system within the network would be in several master registers. The display format instruction would decode the characteristics needed for a particular system from the master format/s associated the with that system.

The variable length registers are useful because data definition is independent of the operations performed on them and the variable length formatting is accessible to the ordinary user. Field characteristics can be associated with this independent field definition and are not tied to a definition with an operations program that has been designated with a specific or symbolic location. The interactive format registers permit direct definition and change of variable length data fields without effecting or even looking at the operations program. These same registers permit configuration of operations independently of each other.

The machine works one character at a time; characters are the smallest element input, or output by the control unit. They are defined and accessed as fields, but within the instructions decode unit, a field is always an aggregrate of characters.

The formats contained in the display register are decoded sequentially in the display ASR data out and the formats in the master register are decoded according to the instruction format contained in the display ASR data out. The master formats operated on by the display format instructions are stored in the ASR data field. Any particular master format is transferred from the ASR data field 203 to the master data in ASR to print selection of data fields accessed one character at a time from RAM.

Reduction of data into the smallest possible elements using the dependent index register—the master register means they must be recombined to form any desired data field by the active status registers. One reason to separate fields into characters and then recombine them into fields is that characteristics are often particular to those smallest element characters, rather than to fields. In this way, characteristics are made independent of the operations, and operations are independent of each other.

There are often registers that intersect with the display and master registers. The RAM is referred to as the data field register, for it is the memory containing data used in operations.

The I/O register which holds as many characters as fit on a printed page or a CRT screen, is used to structure and create formats during the setup process. The I/O register and the data field register have sequencers that can count and access fields by characters. At the time the field length is determined, during the set up process, the need to calculate field length makes a character an element smaller than the field itself so the system permits entry of length a character at a time, through the keyboard into the I/O register for transmission to the master register.

There are some places within the machine, where the field definition, rather than a character is the smallest element to be operated on. In the case of the master ASR data in and Display ASR data out, where operations are defined, the smallest elements are fields—in this case, operations are independent of field length and field characteristics. What is fundamental to the system is that the registers always contain format definitions that recombine the smallest elements in the system, whether that be characters or fields. In this way variable length fields become a workable reality, and n-dimensional formatting becomes possible.

The need to look at several different levels of format so that data fields may be made contiguous for the purpose of storage and I/O is solved with the invention. It includes a control unit having means for defining CRT, printer, and data storage locations to look like each other, and various sets of registers that create levels of formatting so that one piece of data can be viewed n-dimensionally. The data being operated on is held in the control unit in one place—the ASR-Field, the field register. The control unit has a unique combination of active status registers (ASR's) that are used to hold multiple data formats according to type of operation being performed. There are a series of associated register sequencers that are used to hold address locations and enable levels of ASR that are then loaded with formats according to information stored in the machine during the set up process. The several levels of format ASR's associate one or more master field formats with a display field formats.

There is a format ASR-Data-In, used to create field definitions which maintain and store the data format as it came in from the keyboard. This provides a means for changing the ways fields come in—the length and alphanumeric characteristics, in combination with preparing formats that change how they go out. One value of the ASR-Data-In is that it permits the user to back data formats out and change them without necessarily changing the whole system.

The multilayered formatting of data going out of the control unit occurs in a different register—the ASR-Data-Out. It provides the capability of operating on data for calculations, or operating on data for output without changing the data to the form in which it is going out. Hence it allows the data to be changed in structure as easily as it was structured in the first place.

The ASR-Field is a data register that brings the two ASR format registers together by operating on data in one place. Thus, data operations formats are separated from the data entry formats, but the data entry and operations occur in one place—the ASR Field.

The functions performed by the ASR-Data-In format register and the ASR-Data-Out format register are well-known in the state of the art, when used to segment data according to a desired format. To perform these functions simultaneously as formats and to store and operate on the data in a separate register is unique and useful. It is novel to provide the capability of changing how data goes out, with the same process that is used to enter the data in the first place. The combination of format registers ASR-Data-In and ASR-Data-Out permits variable formatting that is interactive and encompasses any aspect of that data from start to finish of machine operations.

The ASR's allow formation of a set-up process that permits keyboard input of field calculations and field display configurations as though the fields were numbers in a calculator, where many functions are available.

The ASR register sequencers connect the ACR's the format registers, and the field registers so there is an effective one to one correspondence between the locations in the storage and peripheral devices. They are used to define locations as displacements so that data from one register can be condensed and represented more efficiently in another register (usually the master) but expanded back to its original dimensions for the purposes of changing a format or data structure at any time.

The flags and select logic control use the registers during the sequential set-up process and during normal operation. The flags are bits that when set indicate the state of any particular register. The select logic is used to control access to and transfer to any particular register and the interaction between registers.

In the data formatter, there are five types of format and record register: the I/O, master, temporary, display, and print. Each register has a specific number of location bits that correspond to character locations in the peripheral devices, or in the data structure. The I/O register has bits as such. The master, temporary and display registers have nibbles, and the print register has bytes. The I/O register has enough bits to accommodate each character location on the printer and CRT. The location bits correspond to character locations in the peripheral devices. Location nibbles in the master, temporary and display format registers correspond to character locations configured as DB formats. The DB nibbles provide both format and data format information. The characters in the I/O register locations are condensed as displacements to format locations in other registers. The print register is used for formatting data going out. Each register has a set of counters. The I/O register location counters count one bit at a time, the master and temporary and display register counters count one set of DB's at a time, or one nibble at a time.

In summary, a data processing system having an input for receiving digital data to be processed and an output for displaying processed digital data includes an improved control unit with random access digital storage means, such as RAM, comprising a linearly arranged plurality of sequential storage locations of variable length free of fixed word boundaries coupled to the input for receiving, linearly storing and accepting operations upon, a sequence of variable length strings of digital data signals, such as those stored in the variable length registers, which are free of fixed word boundaries, a word being formed of a number of characters. There is a source of data format indicators including string format indicators each including a field signal identifying the boundary location of at least one of the strings of the digital data signals in the random access digital storage means and at least one other attribute of the string and process format indicators each including an operation signal identifying an operation to be performed in connection with manipulating strings of digital data signals and the process format indicators. The boundary location of a string is typically the location of the first character in the RAM of a string. There are at least string active status register means, such as an ASR data-in register, for identifying by pointing to the string format indicators and process active status register means, such as an ASR data-out register, for identifying by pointing to the process format indicators. There is central processing means including control means for manipulating digital data signals in accordance with the operation signals, the control means being coupled to the random access digital storage means, the string and processing active status register means and the source of data format indicators and being responsive to the field signals and the operation signals for effecting manipulation at least some of which is entirely outside the control means and in the random access digital data storage means of strings of the digital data signals designated by identifying ones of the field signals in accordance with the operation signals. The control means is also coupled to the input and output and is responsive to the string format indicators and the process format indicators for controlling the entering of digital data signals from the input to the random access digital storage means and the exiting of stored digital data signals from the random access digital storage means to the output. There is means for coupling the random access digital storage means to the output.

DETAILED DESCRIPTION OF PREFERRED EMBODIMENTS

Figure 1:
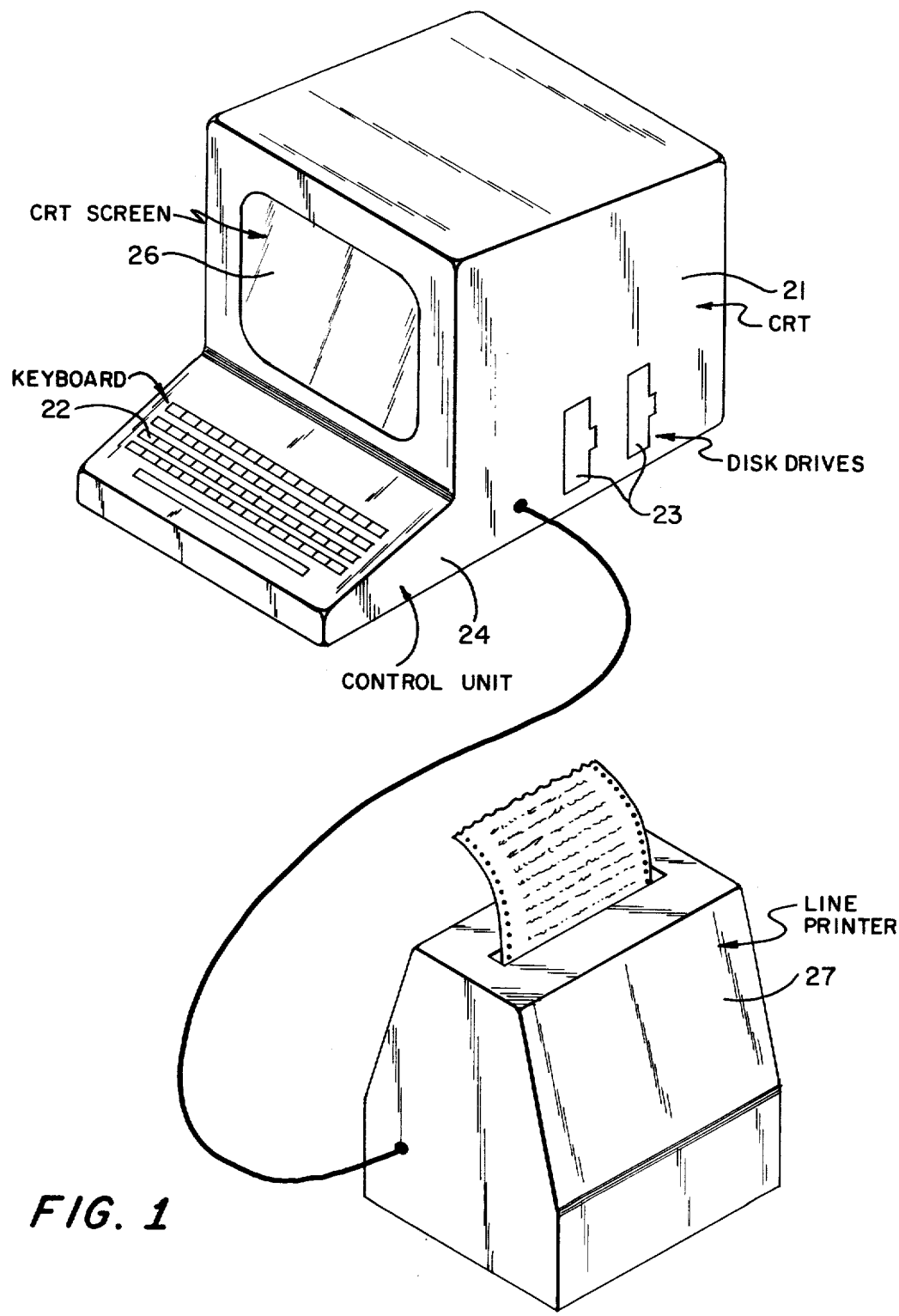
FIG. 1 shows a keyboard, an interactive display terminal, a control unit, disk drives, and a printer.

Turning now to the drawings and referring specifically to FIG. 1, there is shown a typical configuration of components used in the system. The keyboard 22, CRT 21, disk drives 23, and printer 27 are made an integral part of the data structure by the system control unit 24.

Figure 2:
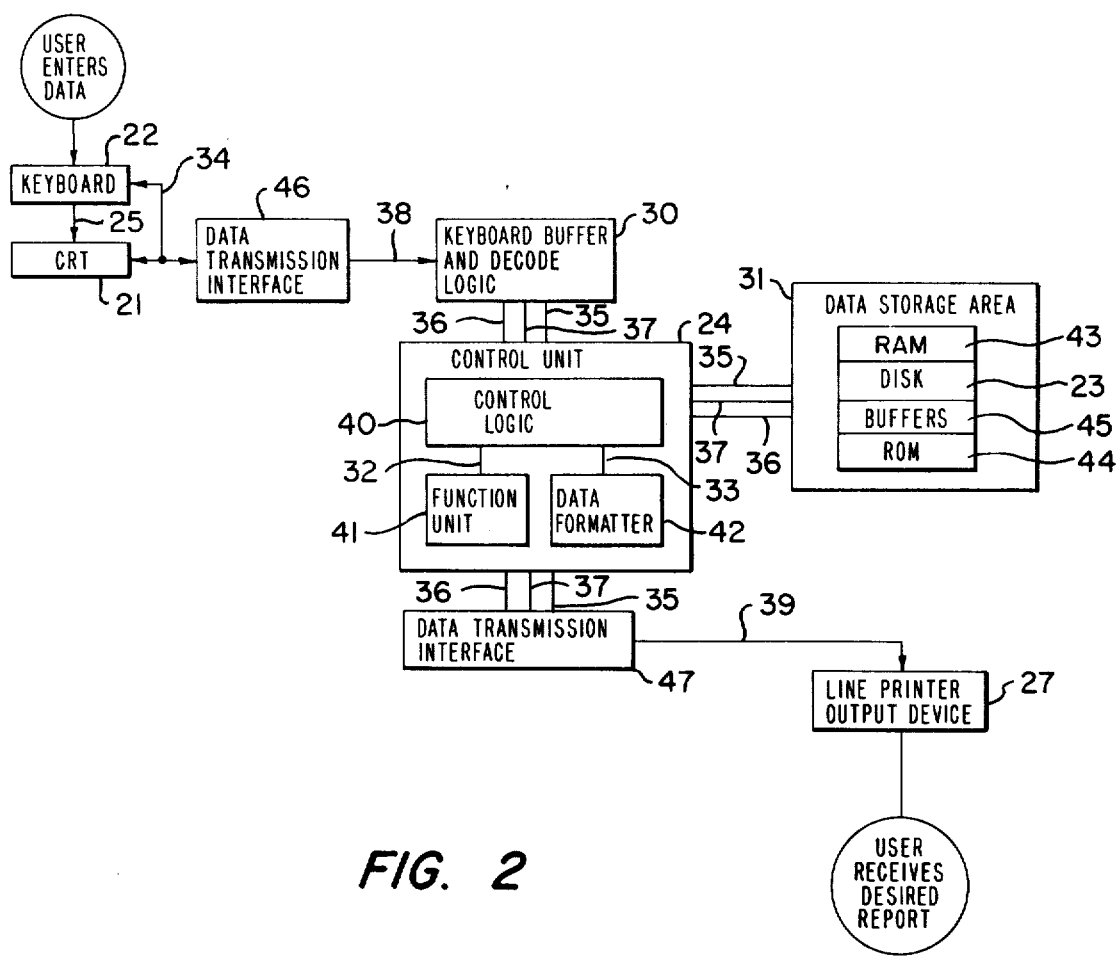
FIG. 2 is a block diagram showing the same system components shown in FIG. 1, along with the data transmission interfaces, and random access storage areas.

FIG. 2, a block diagram of the system components, shows the I/O devices connected to the novel control unit 24 which processes multiple levels of format simultaneously. The system provides a means for entering data on a keyboard 22. The keyboard 22 generates signals that are transmitted on a line 34 to the data transmission interface 46, which transmits those signals on a line 38 to the keyboard buffer and decode logic 30, which is connected with three lines, the data bus 36, the address bus 35, and the enable lines 37 to the control unit 24. The keyboard signals transmitted on these lines to the control unit 24 are used for setting up data formats in the control unit 24 that are used to impose structure on the data within a file. They are also used for data entry. The control unit 24 permits the user to decide to change existing formats, or to add new ones, just be reformatting the data upon entry.

There is a unique set-up process that allows the user to set up or change formats. Basically it involves dividing data into fields, assigning numbers to each field, and then specifying various types of calculations that are to be done on a field. The fields can be manipulated vertically or horizontally for the purposes of display and/or calculation, the machine permits variable length of records within a file, and/or records within a file that are used to access a new file, or field within a record that is used to access an extension of that record. Also, established fields may be subdivided to form available subfields that may then operate or be operated on independently.

The control unit 24 is a processor that permits comprehensive formatting of data so that what computers presently do with a program can be done by the user within the data structure itself.

The control unit 24 is composed of several units: the control logic 40 is connected on a line 33 to the data formatter 42 and with a line 32 to the function unit 41. The same data bus lines 36, address bus lines 35, and enable lines 37 connect the control unit 24 to the data storage area 31. This area contains RAM 43 Disk 23, ROM 44 and RAM buffer storage 45.

The RAM 43 may comprise a solid state circuitry. The bulk storage 23 may comprise a disk, charge coupled devices, magnetic bubbles, electron beams, and/or holograms, or other suitable storage. The ROM 44 provides firmware microcode for the system, through the control logic 40 may also define the instructions and functions with ROM 44 components.

The operation of the system will be better understood from the following examples. A simultaneous horizontal and vertical calculation is the display format being able to add the vendor invoice across, while at the same time maintaining subtotals in each category of goods provided by the vendor. An example of a simultaneous horizontal and vertical display format is the ability to display three fields of data on the first line of the CRT, and at the same time, format the printer so that those fields appear in different sections of the printed page. An example of variable length records within one file is records about an available set of grants from the National Bureau of Standards where the description of each record starts out allocated as 200 words in year one, and that is all that is allocated, but where two records in the set grow to 1000 words each within two years, while all the other records grow a little, but not that much. The variable formatting capability allows the user to expand the allocated space for the longer records, while reformatting the entire file to expand just the necessary amount. An example of a field within a record that extends the record, is a miscellaneous category designated to be eight characters long but when it overflows can become 64 characters long, formatted in any variety of ways, or even extendable to 128 characters. All this illustrates the flexibility provided by the ability to change formats at any time and to maintain separate, but operating simultaneously, active status registers (ASR's) for data in and data out.

Figure 3:
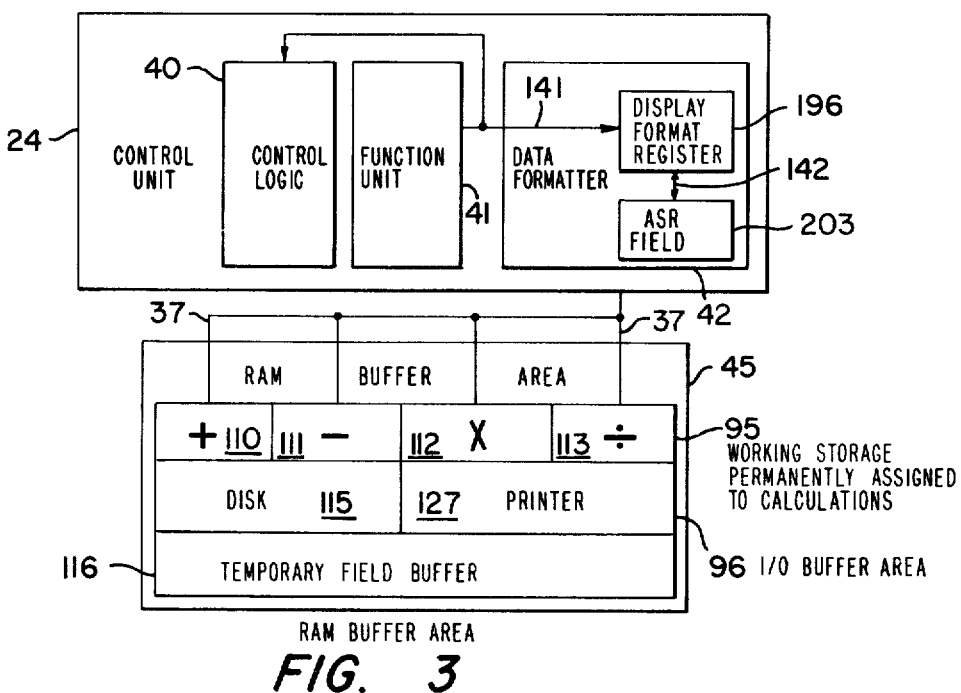
FIG. 3 is a block diagram showing the interaction of the control unit with the RAM buffer areas.

FIG. 3 shows the section of the data storage area 31 allocated as buffers 45, used to hold data temporarily as working storage while calculations are being performed and for data I/O. This buffer area 45 creates working storage that is permanently allocated. Each buffer is assigned uniquely to a function within the function unit. The buffer area 45 has several working storage buffers with a fixed length of 200 byte locations for each calculation.

Each calculation format has a unique RAM working area: e.g. plus has one 110, minus has one 111, multiplication has one 112, and division has one 113. Permanently tying the working storage to the functions means that the user does not have to define working storage for overlapping computations, and that the very need for it is invisible to the user.

The permanently assigned working storage buffers 95 are loaded from the data bus with an enable signal on a line 37 from the control logic 40, which receives an enable signal on a line 141 from the function unit 41. The function unit 41 receives an enable signal on a line 141 from the display format register 196, which receives a signal on a line 142 from the ASR-Field 203.

There is also a buffer 127 for printer I/O and and buffer 115 for disk I/O, and a buffer 116 for temporary fields. The disk buffer 115 is large enough to manage the maximum possible length of 15 records coming in and going out to the field register 100, or a total of 30 records, in the preferred implementation. The maximum length of the record is determined by the size of the ASR's 200 (FIG. 5) in the data formatter 42, 64 characters in the preferred implementation of the machine.

The printer buffer 127 is large enough to hold an entire page of character locations to be output to the printer 27, which in the preferred implementation has 8712 byte locations. The printer buffer 127 is used for I/O and to hold partial lines of print from the printer register 103 (FIG. 7) that go beyond one line, while fields are being output to the CRT screen 26. Characters to the CRT are output directly from the disk buffer 115.

The temporary record field buffer 116 serves exactly the same purpose as the disk buffer 115, except that these records are created internally by the control unit 24 as a result of horizontal or vertical calculations. In the preferred implementation of the control unit 24 the user can create 256 temporary fields to hold keyboard entered operands and results of calculations with more fields available if the number of characters in the field is too large.

Figure 4:
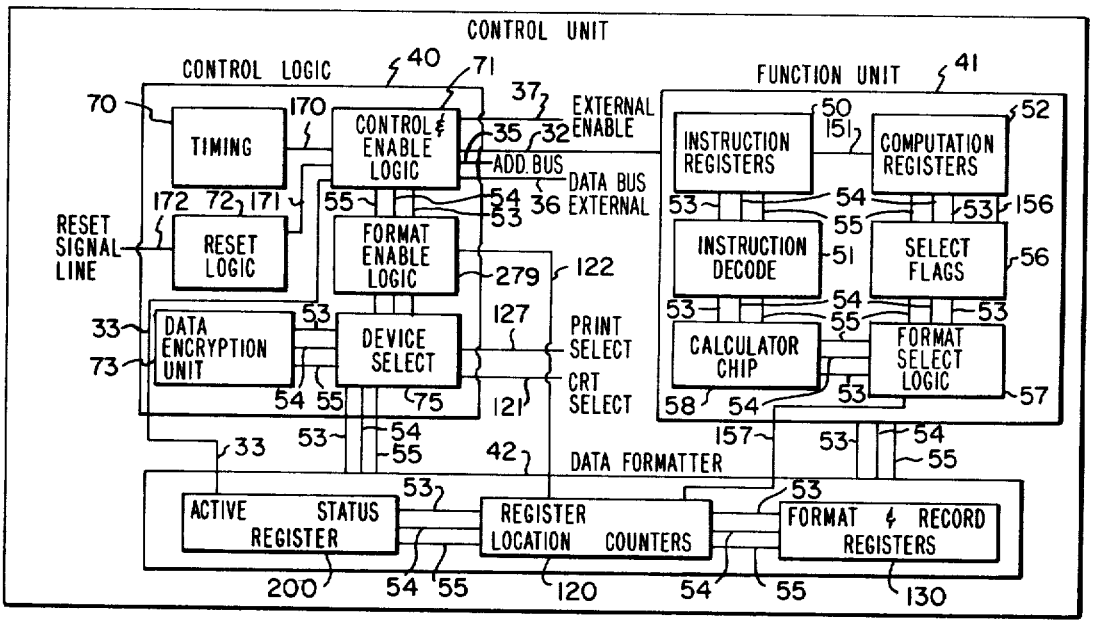
FIG. 4 is a block diagram showing the data bus lines between the control logic, the function unit, and the data formatter used to send signals back and forth between these segments of the control unit.

FIG. 4 shows the components within the control unit 24 architecture connected with the data bus lines 53 and the address bus lines 55. These lines send data and address information universally to all parts of the control unit. The enable lines 54 are used to select a particular part of the control unit 24 and disable the others during any particular operation. The address bus 55 is sometimes used to select a particular unit. The enable lines 54 provide an enable signal to a component; actual loading of information and transfer of information from one component to the next occurs on the data and address bus lines 53 and 55.

The control logic 40 is comprised of the timing unit 70 which provides timing for the system through the control and enable logic 71 on a line 170. The reset logic 72 provides reset signals on line 171 to the control and enable logic 71, and directly to other system components on a line 172. The control and enable logic 71 provides the external system bus control on line 35 for the address bus, and on a line 36 for the data bus. It also provides an internal system bus on a line 53 for the data bus, on a line 55 for the address bus, and on a line 54 for the enable bus. There is also an external system enable line 37. The function unit enable is provided on a line 32, and the data formatter enable is provided on a line 33.

The format enable logic 74 provides enables on a line 122 to the register location counters 110 which provides selection of the levels of format register.

The device select logic 75 provides signals to the external devices. The print select signal is sent on a line 127, and the CRT select is set on a line 121.

The optional data encryption unit 73 is available to permit the encoding of microcode, data and addresses, internal to the control unit 24, as well as for communications interfaces. It is connected to the address bus 55 and the data bus 53 and to the control unit enable lines 54. It is the subject of a separate patent application.

The two function components of the control unit 24, the data formatter 42, and the function unit 41 are enabled by the control logic 40.

Figure 5:
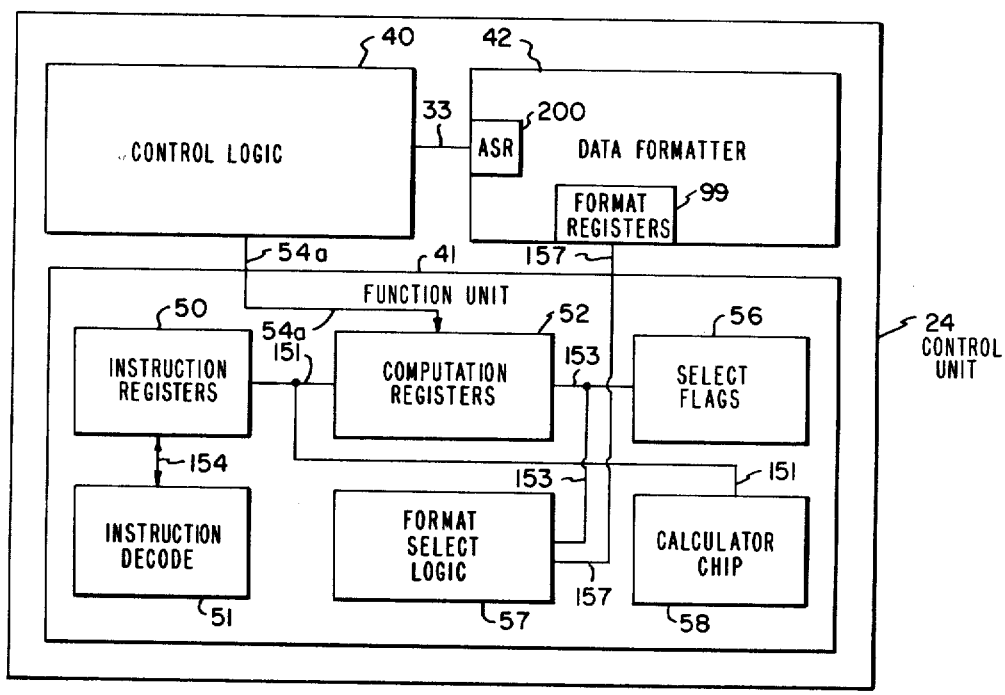
FIG. 5 is a block diagram of the function unit showing the instruction registers, instruction decode, computation registers and flags, and the format select logic.

FIG. 5 is a block diagram of the control unit 24 illustrating the details of the function unit 41. The function unit 41 is composed of the instruction registers 50, instruction decode 51, computation registers 52, select flags 56, format select logic 57, and the optional calculator chip 58. There are several flags, computations, and instructions available to the function unit as shown in table one.

The flags correspond to format and record registers. They are used both during the set up process and during normal operation to select a register or registers.

The instructions are normally used to initialize fields, initiate data movements, move data round, or terminate data movement in an I/O program. They are invisible to the user and/or formatter of the system because each instruction exists as a separate set up step, except that in some cases several instructions may be combined to format a set up step. For the most part, the names of the instructions make their use obvious, except that EOR stands for a terminator—end of record.

The computation instructions act on data in precisely the same manner the instructions do, except they are used to modify data with the indicated kinds of operations. The calculations are called out during one step of the set up process where the operator types in the two operator codes for operand fields, the operator, and the result field, for example to add field 2 (extended list) to field 5 (subtotal list), and place the result in field 17, the operator types 2+5=17, the numeric entries correspond to field numbers.

The function unit 41 is enabled from both the control logic 40 and the data formatter 42. The control logic 40 is enabled from the data formatter 42. Within the function unit the computation registers 52 receive instructions from the instruction registers 50, whose instructions are decoded in the instruction decode 51. The format select logic 57 and the select flags 56 also provide select information to the computation registers 52.

Data is input and output from the data formatter with an enable signal from the control logic 40 which sends an enable signal on a line 54a to the computation registers 52 when it receives a signal on a line 33 from the ASR's 200 in the data formatter 42.

The computation registers 52 are selected on a line 151 by the instruction registers 50 whose contents are sent to the instruction decode unit 51 when enabled on a line 154, and sent back to the instruction registers 50 which receive an enable signal on the same line 154. The optional calculator chip 58 is connected to the computation registers 52 and to the instruction registers with the instruction register enable line 151. The calculator chip performs calculations in the same way the computation registers do, but offers more specialized functions. The computation registers 52 when enabled send a select signal on a line 153 to the select flags register 56 and on a line 153 to the format select logic 57; the indicated function sends a select signal to the data formatter 42 on a line 157 which selects the format registers 99.

Figure 6:
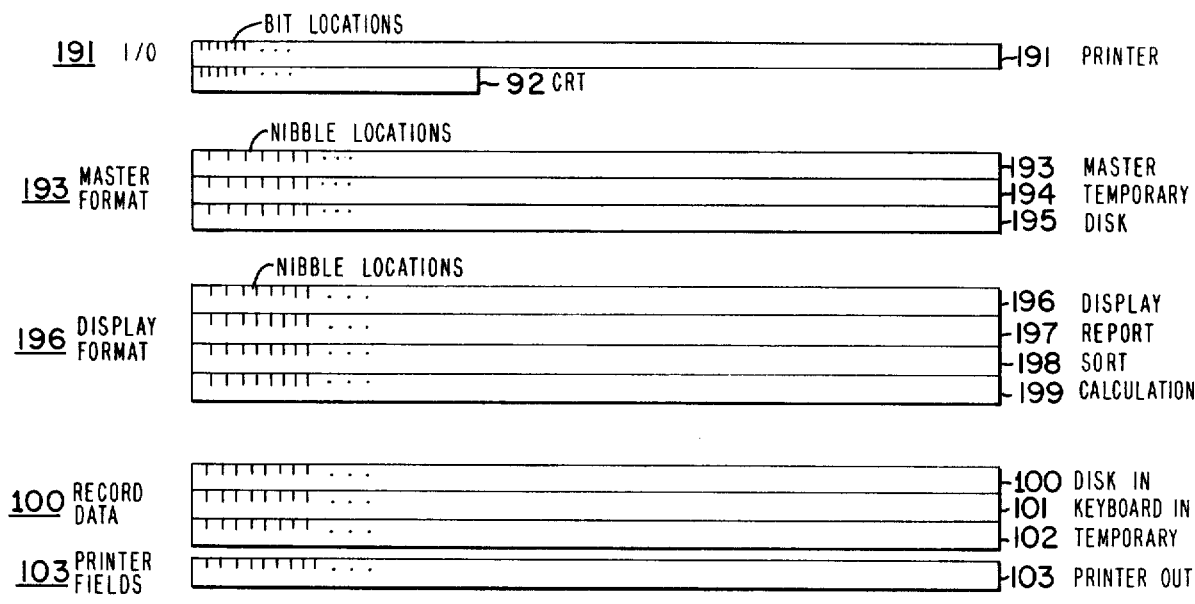
FIG. 6 is a block diagram showing the four types of format register used by the new microcomputer.

FIG. 6 shows the four types of format registers used in the data formatter 42 part of the control unit 24. Format registers are used to define the characteristics of the data fields to be input or output from the system.

The format registers are used to process locations as characters or data. The register locations are permanently allocated to the designated formats.

The registers are divided into four parts: (1) the I/O set-up format registers 191 for the printer 19, and CRT 92, hereafter referred to as the I/O register 191; (2) the master 193, temporary 194, and disk 195 format registers, hereafter called the master register 193; (3) the display 196, report 197, sort 198, and calculation 199 registers, hereafter called the display registers 196; and (4) the input/output buffer format registers for the disk in 100, for the keyboard in 101, for the temporary fields 102, and for the printer out 103, hereafter called the record registers 100.

Register locations in the I/O register 191 are series of successive bits that correspond to the permanently assigned character locations on the disk 23, CRT 21, and printer 27. The master and display registers 193,196 are a series of successive format nibble locations each four bytes long. The output buffer format has as many byte locations as are on a printed page. All these registers have register location counters which count one bit, one byte, or one nibble at a time, whatever is applicable. These are used to find a specific location.

These registers are used when the data files, records, or reports are configured or reconfigured. In the preferred implementation the registers have the following number of locations:

The I/O registers 191 has 1920 locations and/or 8712 locations, one for each character on the CRT screen 26, or on the printed page of the line printer 27. The bit locations are used to format the parameters for every field of data that is input or output from the system. The two registers may be the same, since they are never used at the same time, and are referred to as the I/O register 191. They are used only during the set up process—one location at a time to set up the data fields and data formats. This I/O register permits the system to be completely general during the set up process by permitting the user to select any character location as the beginning of a particular field, or at the beginning of any field function flag. Once the parameters for data fields have been set in the I/O register 191, the format can be condensed. This is because once that beginning point has been selected, the generality of being able to set the beginning point of a field at any place on a screen or printed page is no longer needed—so long as that beginning point can be retrieved for reformatting purposes at any time during system operation. That is, all the formats can be condensed to describe what happens to the data within a field so long as the condensed version contains enough information so that the formats can be reexpanded to the original version of the format, for reformatting purposes.

The master format register 193 and display format register 196 are used to create and display formats from the information in the I/O register 191. The means for condensing and using condensed formats is described in FIG. 9.

The master register 193 is ten times longer than records stored on the disk, or 1K nibbles long, when the record is 64 bytes long. This leaves room for deletions of master fields, which are never really destroyed, just new ones are added on the end.

The output buffer format register 103 is a set of location bytes that correspond one to one to the permanently assigned character locations on the CRT 26 and printer 27 with enough locations to hold one page of characters, that is, a maximum of 8712 character locations in the preferred implementation. This memory may be a combination of virtual memory that outputs to a disk in 128 word segments. It is used to hold CRT formatted data until the same data is output to the printer interface 46. Data inserted in the output buffer 103 may also be inserted in this output register, but it does not go to the buffer until it has been formatted in the register 103, though it can still be reformatted in the buffer 103.

Figure 7:
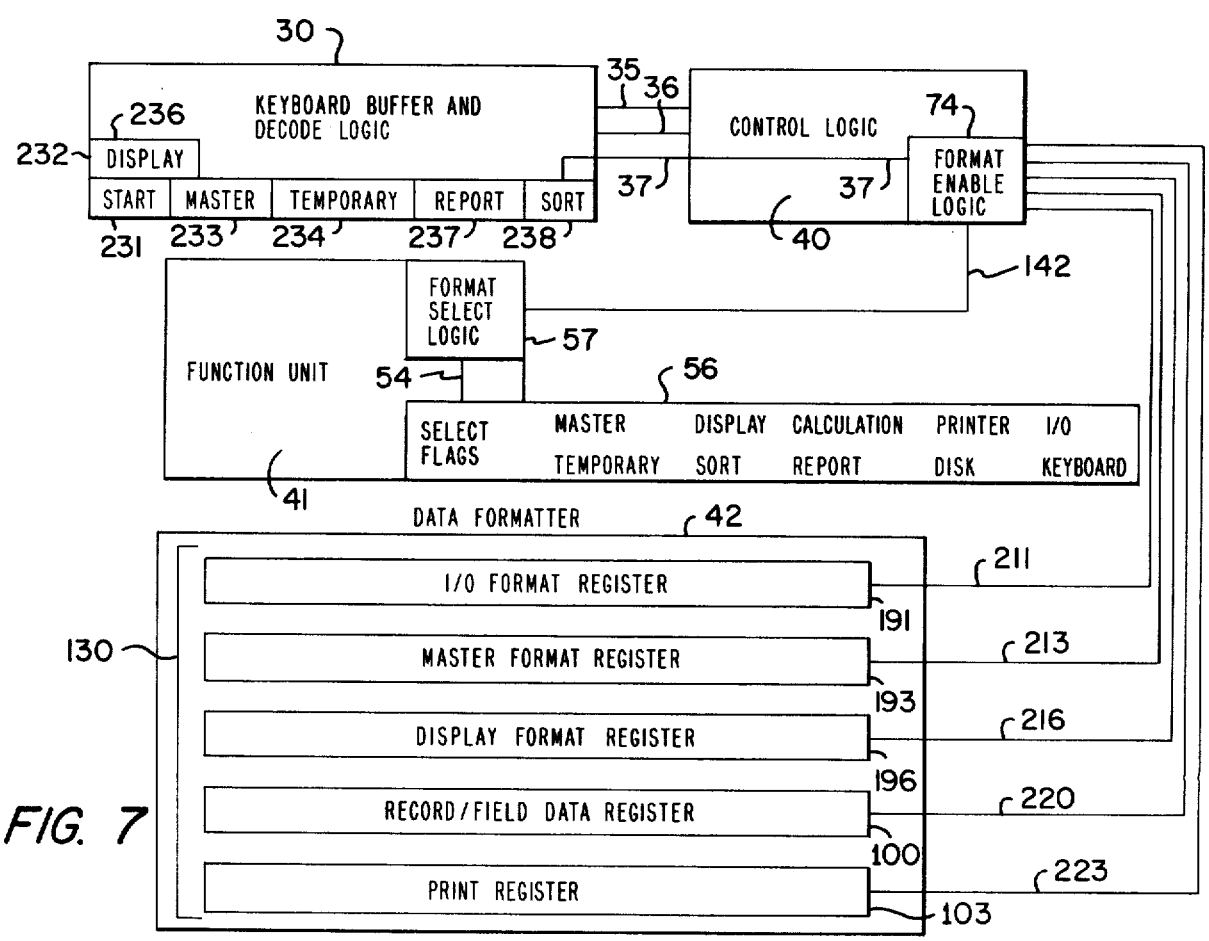
FIG. 7 is a block diagram showing the format enable logic used to select the format registers.

FIG. 7 shows the format enable logic 74 that is used to select the variety of format registers 130 available in the data formatter 42. There are three ways to select a register: (1) through keyboard entry, (2) with an enable signal from the flag register 56, and (3) with an enable signal from a flag that is addressed internally within the format registers.

The format select logic 57 that is connected to the format enable logic 74 on a line 142 provides signals that are used to select configurations of format registers and create n-dimensional levels of format that interact with each other.

The keyboard buffer and decode logic 30 sends a variety of key signals on the data bus 36 when enabled on a line 37 so that all units within the control unit 24 receive the key signal. The various kinds of select logic disable all units which do not need the signal, and enable the particular units that should have the key signal.

The format enable logic uses several special set up key signals described as follows.

Selection of the start key 231 sends an enable signal on a line 37 to the control unit 24 which sends a signal on the same line 37 to the format enable logic 74 which in turn sends a signal on a line 211 to the I/O format register 191 and enables it for use.

Selection of the master key 233 sends a signal on a line 37 to the control logic 40 which sends a signal on the same line 37 to the format enable logic 74 which sends a signal to the master format register 193 and enables it for use.

Selection of the display key 236 sends a signal on a line 37 to the control logic 40 which sends a signal on a line 37 to the format enable logic 74 which sends a signal on a line 216 to the display format register 196 and enables it for use. The report and sort registers are optional equipment, and their functions are assumed by the display register in the ordinary implementation. All these registers are format registers and their use during set up and normal operation is described below in the section on the ASR's.

The standard keys for the keyboard 22 are sent as signals from the keyboard buffer and decode logic 30 on a line 37 to the control logic 40 and sent on the same line 37 to the format enable logic 74 which sends them as a signal on a line 220 to the record/field data register 100 and enables it for use.

The format and record registers 130 may be selected with flags during normal operation instead of by keys for set up purposes. That is, the master flag in the select flag 56 part of the function unit 41 sends an enable signal on a line 54 to the format select logic 57 which sends a signal on a line 142 to the format enable logic 74 of the control logic 40 which sends a signal on a line 213 to the master format register 193 and enables it for use. In this way the flags look like keys.

The format select logic 57 contains decode logic that selects the select flags in the flag register 56 which when set provide an enable signal on a line 142 to the format enable logic 74 in the same way the format keys 232 provide set up signals. They provide enable signals from the format enable logic 74 on the same lines 211, 213, 216, 220, 223 to the format and record registers 130.

The format registers 130 themselves contain select flags that are decoded in the ASR's 200 as described below in connection with FIG. 9. The signals are sent to the format enable logic 74, and are then used to select a format record register 130 from the format enable logic 74, as though the signal had come from the format select logic 57 or from the keyboard buffer and decode logic 30. In this way levels of format register are selected, and levels of format register are selected from the data structure itself.

Figure 8:
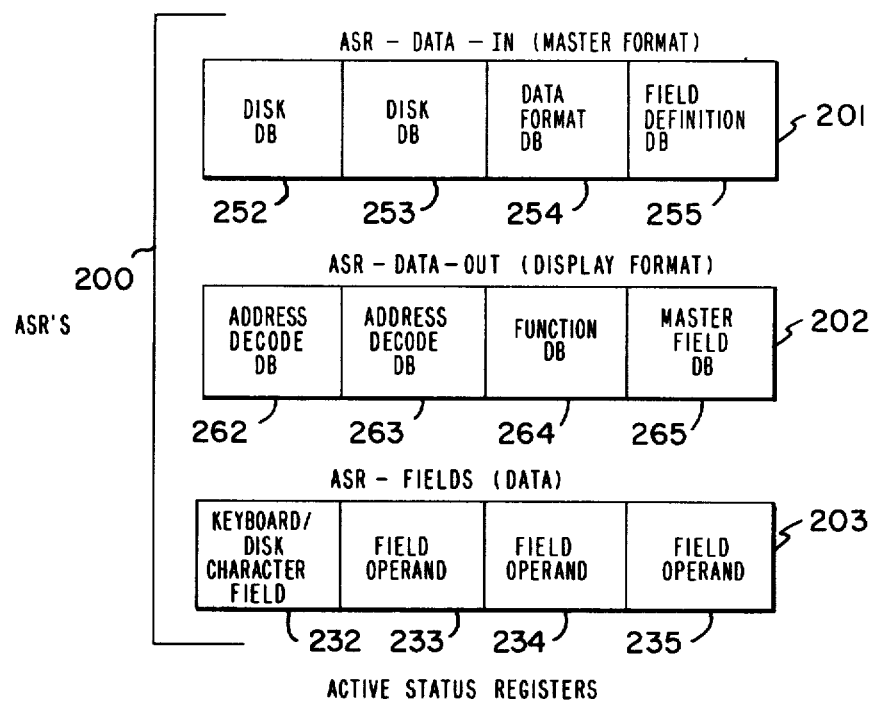
FIG. 8 is a block diagram showing the active status registers used to hold the formatting data signals.

FIG. 8 shows the three types of ASR that compose the system: ASR-Data-In, ASR-Data-Out, and ASR-Field. They are used to evaluate and to move data to different levels of processing within the control unit. All possible characteristics which may distinguish a piece of data, all possible ways of creating functions within a function, and/or of using one level of format to provide a condensed version of another one are provided for in the three ASR's.

The ASR's receive data during the set-put process and condense it to a format marking the singularities that describe each data field as described hereafter in the set up process. They are also used during the normal operation to hold the partial data formats selected by the user to perform a designated task. The operations on the data in the ASR-Field are a result of the formats received from the ASR-Data-In and ASR-Data-Out.

The ASR's are comprised of several format word nibbles. In particular, the ASR-Field 203 has four nibbles. The field nibble 232 is used to accept characters from the keyboard one at a time create a field or accept characters from the disk that already form a field. This nibble is extendable to a 1K register with use of the extended level logic used in the set up process. Two nibble locations 233, 234 are allocated at operands within a calculation and one nibble location 235 is allocated as a result.

The ASR-Data-In 201 is used to process master formats—to accept and process DB field format definitions from the master register. There are four DB location nibbles on the ASR-Data-In 201. The first DB location 255 gives the field definition, the second DB location 254 gives the data format, and the third and fourth DB locations 252, 253 give the disk displacement.

The ASR-Data-Out 202 is used to process display formats—to accept and process DB format field definitions from in the display format register 196. There are four DB location nibbles in the ASR-Data-Out: the first DB location 265 provides the master field number, the second DB location 264 defines the function and the third and fourth DB locations 262, 263 provide address and decode information for more master field numbers.

Figure 9:
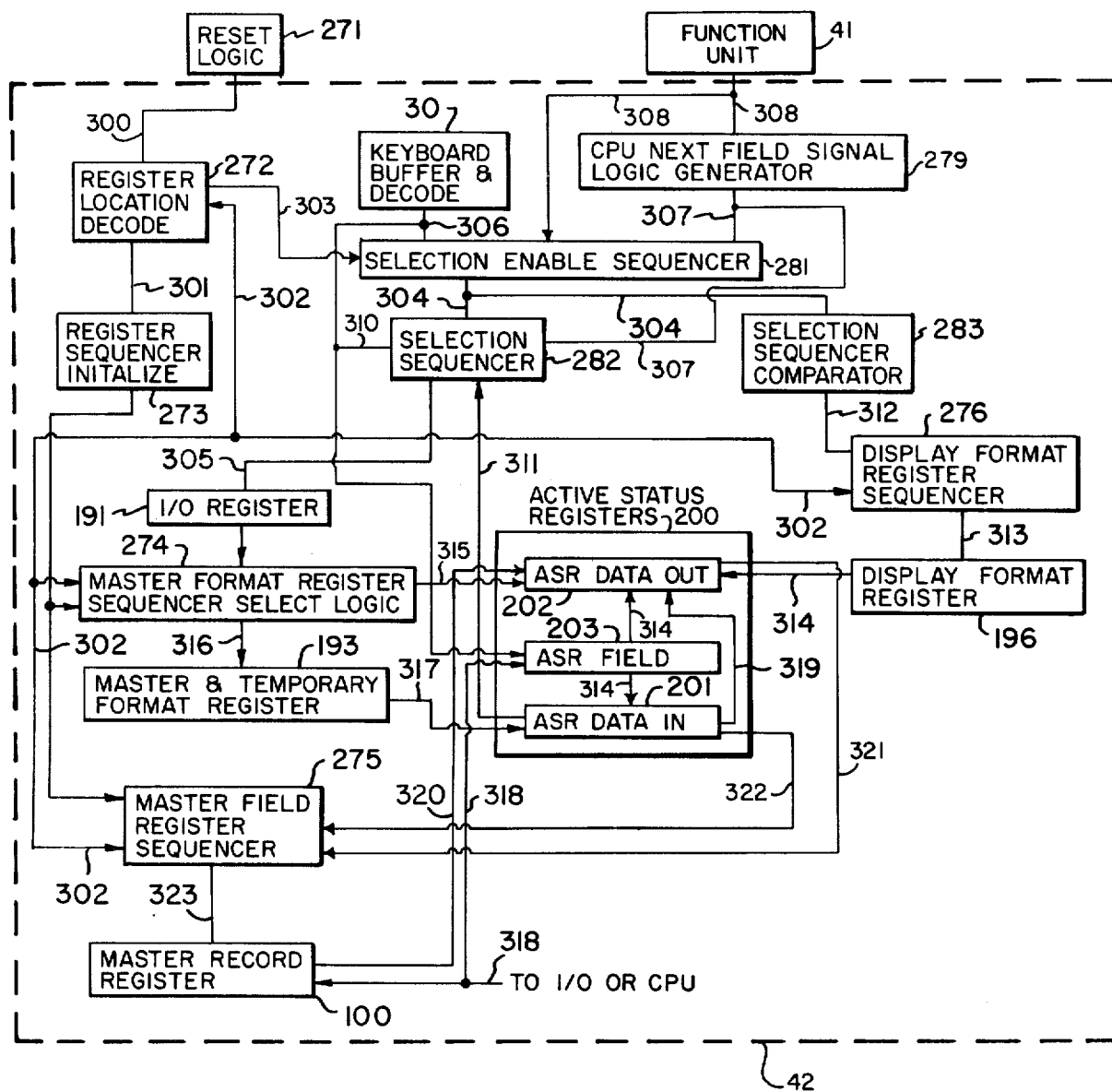
FIG. 9 is a block diagram showing the data formatter active status registers, the format registers, and the register select logic.

FIG. 9 shows the data formatter portion of the control unit 24. The data formatter 42 is composed of ASR's 200, the master format register 193, the master register sequencer and select logic 274, the display format register 196, the field register sequencer 275, the select sequencers 282, the register decode 272, and the I/O register 191.

The control unit takes data from two sources—the keyboard buffer and decode 30 and the field register 100. The data is always loaded into one place—the ASR-Field 203. The control logic takes format DB's from two sources—the master format register 193 which is loaded into the ASR-Data-In 201, and the display format register 196 which is loaded into the ASR-Data-Out 202. These DB formats are selected interactively by the DB locations within the format ASR's, and are used to format data in the ASR-Field uniquely. That is, ASR-Data-In 201 keeps a record of how the data is formatted in the one dimension of unique display locations on the CRT screen 26 or page from the printer 27, that were used to take data into the computer and put it on the disk, while the ASR-Data-Out 202 keeps the record of the different ways in which data fields will be combined within the unit 24 and output. The ASR-Dara-Out 202 reformats the data to the two dimensions needed for putting it back on the screen 26 or printer 27.

The invention takes advantage of the event that data comes in from the keyboard in a different format than the one used to put out—coming in, data is linear, going out the CRT 21 and printer 27, it needs to be two dimensional. The machine recognizes this difference by creating two separate kinds of ASR, so that the dynamic problem can be handled simultaneously, for the programmer rather than with a more cumbersome snapshot of moving data back and forth from the linear to the two dimensional dimension through conventional programming techniques.

The register sequencer 273 provides a means for creating an origin that marks the beginning of consecutive register locations. The reset logic 271 provides a signal on a line 300 to the register location decode 272 which sends a signal on a line 301 to the register sequencer 273, which sends a signal on a line 29 to all the register sequencers master format 274, master field 275, and display format 276 that then provides a reset to these sequencers. The register location decode 272 sends a separate signal on a line 303 to the selection enable sequencer 281 which sends a signal on a line 304 to the selection sequencer 282, which sends a signal on a line 305 to the I/O register 191, and initializes that register. The resets that provide the origins are arbitrarily defined by the manufacturer and in some cases by the user through the keyboard input to the function unit described in FIG. 5.

Once defined, consecutive order of register locations is established by the register sequencers.

A character entered on the keyboard 22 is sent from the keyboard buffer and decode logic 30 on a line 306 to the selection enable sequencer 281 which when enabled from the next field enable logic 279 on a line 307 or from the function unit 41 on a line 308 sends a signal to the selection sequencer 282 on a line 304 to decrement the contents of the sequencer 282, and sends a signal on the same line 304 to the selection sequence comparator 283 that compares the contents of the selection sequencer 282 to zero. If the number in the sequencer 282 is not zero, the character from the keyboard buffer 30 is loaded with a signal on a line 310 from the selection sequencer 282 into the keyboard DB 232 of the ASR-Field 203. The selection sequencer 282 is loaded with an initial value on a line 311 from the ASR-Data-In 201, that provides the value of the number of selections permitted in a field from the field definition location DB 255 in the ASR-Data-In 201 so that as the selection sequencer 282 decrements, it approaches the limit for that field set by the field definition DB from the master format register 193, as shown in The ASR-Data-In 201.

The selection sequencer 282 is reset to permit beginning a new field on a line 307 which has a terminator signal from the next field enable logic 279, which is reset on line 308 by a terminator signal from the function unit flag register 41. The selection sequencer 282 may be incremented by a rubout signal on a line 307 from the next field enable logic 279.

At the time the selection sequencer 282 goes to zero either because of a reset from a terminator, or all the permitted characters have been throughput, the sequence comparator 283 sends a signal on a line 312 to the display format register sequencer 276 which sends a signal on a line 313 to the display format register 196 which selects the next display location for the ASR-Data-Out 202 and the display register 196 sends a signal on a line 314 to load the addressed DB location contents.

The ASR-Data-Out 202 sends a signal on a line 315 to the master register sequencer 274 which sends a signal on a line 316 to the master register 193 which sends a signal on a line 317 to the ASR-Data-In 201. The contents of the master format register 193 indicated by the master format sequencer 274 are loaded into the ASR-Data-In 201 on a line 317.

These ASR registers 200 now provide two levels of variable formatting—the ASR-Data-In 201 is an internal register, invisble to the user, that assigns a permanent number to each field of data and locates it uniquely on the disk or in a temporary buffer area. The ASR-Data-Out 202 is the level at which data fields are rearranged by the user in a variety of ways for changing formatting for the printer 27 and CRT 26 both horizontally and vertically, performing calculations on these fields both horizontally and vertically, rearranging the order in which fields are presented, separating into pieces data within a field, and combining various combinations of fields. The combination of these two registers, with the enable logic and enable signals just described, can be used to do all the above, and to create records within a record, and new formats within a record.

Another way these two levels of logic just described can then be used to create n levels of variable formatting is with the following: the data stored in the master format register 193 can be used to create a record format that is then translated into the display register 196 as a data out format, and the record that was in the master format is now in the display form, and the machine is ready for the user to create a new level of master format.

Regarding formatting of the data itself the ASR-Field 203 is loaded on a line 318 from the record register 100. The contents of the ASR-Field 203 may be selected by either the ASR-Date-In 201 or the ASR-Data-Out 202. This is what really creates two levels and by extension n-levels of formatting. The dynamic aspect of the invention occurs because the fields may be selected interactively by the format ARS's 202, 201. That is, the ASR-Data-Out 202 sends a signal on a line 321 to the master field register sequencer 275, and also the ASR-Data-In 201 sends a signal on a line 322 to the master field register sequencer 275 which sends a signal on a line 323 to the master field register 100.

The I/O register 191 accepts characters from the keyboard decode 30 in the same way the ASR-Field 203 does on a line 305 from the selection sequencer 282 during the setup process.

Figure 10:
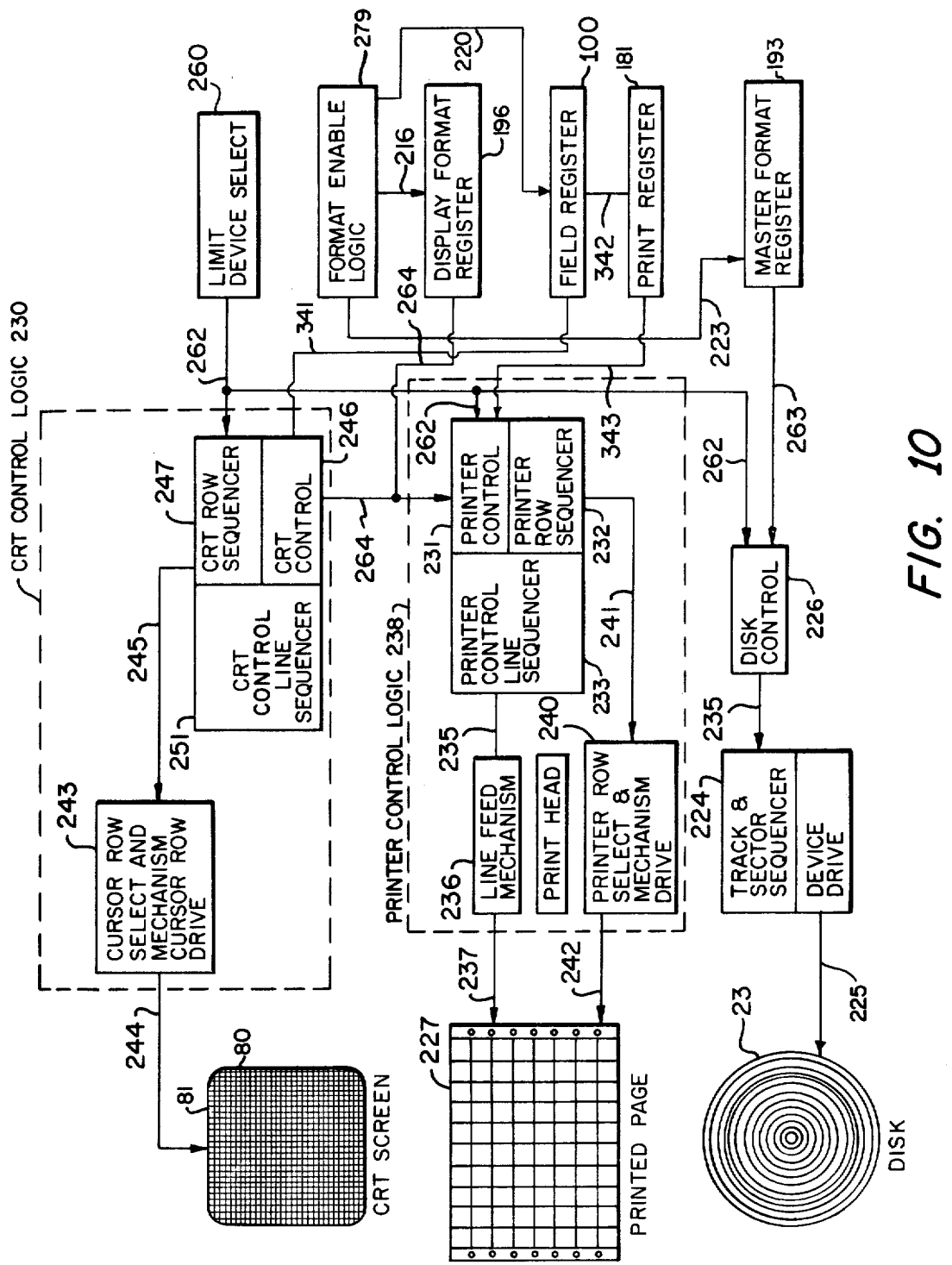
FIG. 10 is a block diagram showing the output control logic and output devices addressed by signals from the active status register—data out, the other format registers.

FIG. 10 shows the control unit 24 means for formatting data for the ASR-Data-Out 202, the effect of this register is to handle data as a combination of discontinuous fields with continuous characters. The data itself is not segmented; the control unit 24 makes the cartesian co-ordinate system of the two dimensional grids linear by defining unique character locations and creating foldable lines to replace the row counter separators. Instead of data that is segmented into a grid, the grid has become a foldable line so far as the data is concerned, and the grid has become one format register, within a set of two interactive format registers.

In the preferred implementation, within the control unit 24 the CRT format is treated as a set of unique character locations that are numbered from one to 1920, the printer format is a set of unique character locations that are numbered from one to 8712, the length it takes to permanently assign a unique number to each location in the CRT screen 26 or page of the printer 27. The unique character locations are an integral part of the data formatter 42. The character locations are assigned a one to one correspondence with the I/O register 191 locations, the register locations then have a one to one correspondence with each other, and therefore create a one to one correspondence between different devices, the printer 27, the CRT 21, and disk 23. The one to one correspondence would not work without the separate data formatter which replaces the need to segment data separately for each different device.

Formatting then takes place from the format registers of the control unit 24 which provides a way of segmenting data without programming.

FIG. 10 shows the two dimensional line 80 and row 81 grid of the CRT screen 26 which is created by the CRT control logic 230. Display formats are selected from the format enable logic 279 with a signal on a line 216 to the display format register 196 which outputs a signal on a line to the CRT control 264 and to the CRT line sequencer 251 and CRT row sequencer 247, which increment the screen cursor on a line 245 both horizontally and vertically.

FIG. 10 also shows the two dimensional line and row grid created by the printer control logic 238. The display format register 196 sends a signal on a line 264 to the printer control 231, and in particular to the row counter 232 which sends a signal on a line 241 to the printer row select 240 which increments the head to move it horizontally to the next character across. The display format register 196 sends a signal on a line 264 to the printer line sequencer 233 which sends a signal on a line 235 to the printer line feed mechanism 236 which increments the paper line feed mechanism and manages the printed page vertically.

The field register 100 is enabled on a line 220 from the format enable logic 279 and sends data to the CRT control 246 on a line 341, to the print register 181 on a line 342, which sends data to the printer control 238 on a line 343.

The master format register 193 sends a signal on a line 263 to the disk controller 226 which has a sequencer 224 which selects the next track and sector on the disk 23. The next track and sector are selected on a line 225 in the track and sector sequencer 224 and position the head to the indicated location on the disk 223.

FIGS. 11-23 show the hardware design of the invention. The integrated circuit chips indicated could be replaced by equivilent devices, the circuitry could be optimized, preserving the functions, or circuitry could be contained in one or several LSI integrated circuits. The eight bus lines in the preferred implementation could be fewer or greater, depending on the central processor.

Figure 11:
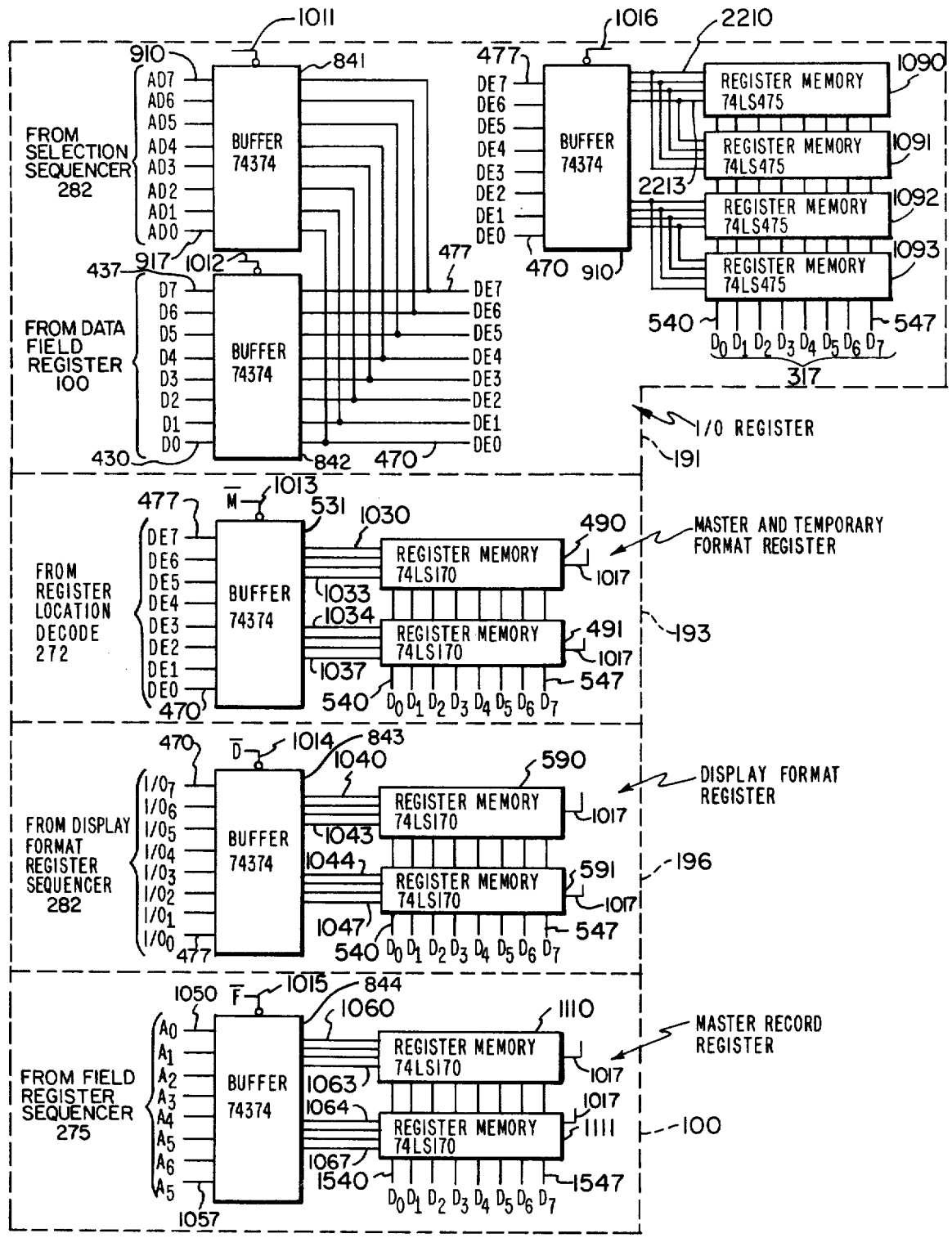
FIG. 11 shows the circuitry of the format data registers used to store format field data, in a buffer form.

FIG. 11 is a diagram showing the integrated circuit components in the format registers 191, 193, 196, 100 of the preferred implementation, used to store format and field data, the buffers 841, 842, 531, 843, 844, 910 used to store address specific locations for addressing a particular register. The I/O register 191 has one buffer 841 addressed with a format location signal sent on a bus line 305 lines 910–917 from the selection sequencer 282. The signals correspond to locations in one of the registers 100, 191, 193, 196, they are addressed generated during the set up process. The second buffer 842 is addressed by signals on a bus line 320/lines 430–437 from the RAM data filed register memory 100 that outputs character information. The address from either buffer 841, 842 is output on the bus line 302/lines 470–477 to the I/O register buffer 910 which stores the address when enabled on a line 1016, and to the master format register buffer 531, when enabled on a line 1013, which receives the address input signals from the same bus line 302/lines 407–477. The I/O register 191 consists of four memories 1090, 1091, 1092, 1093, 74S475 ic's that are used to store one character for each location on the CRT 21, or printer 27, and is used during the set up process to store locations where certain operations will occur, for example, when fields stop and start so that field length can be calculated, output on bus lines 317/lines 540–547 to the master ASR 201.

The master format number may also be generated by using the selection sequencer 282 to count locations and find a field number and output from the I/O register 191 on a bus line 317/lines 540–547 or from the display format register 196 on the same bus line 317/lines 540–547.

The master format buffer 531 consists of a 74374 ic chip with an enable on a line 1013; input consists of a master field number address signal on a bus lines 470–477; output goes on bus lines 1030–1033 to the upper portion of the master format register memory 193, a 74LS170 ic memory chip 490, and the lower portion of the master format memory 193, another 74LS170 ic 491, on bus lines 1034–1037. The master format memory 193 outputs master field format definition signals on the bus line 317/lines 540–547 from four successive locations to the I/O register buffer 842 or the ASR data-in 201, thence providing a detailed format description and location of the field data selected in the master record register 100.

The display format register 196 holds the display formats. It consists of a buffer 843 74374 ic addressed on a bus line 313/lines 470–417 from a set of counters called the display format register sequencer 282. This buffer 843 receives data from the bus line 313/lines 470–477 only when enabled on a line 1014; it 843 outputs the high order address on lines 1040–1043 to a register memory 590 74LS170 ic component and outputs the low order address on lines 1044–1047 to a register memory 591 74LS170 ic component. The display format register memories 590, 591 when enabled on a line 1017 output the four bytes of display format data on a bus line 314/lines 540–547 to the ASR data-out 202.

The master record register 100 holds the data fields. It 100 consists of a 74374 ic buffer 844 which holds the high order word address and low order word address of the character to be selected from the data in a particular field.

The buffer 844 is loaded from the address counters 1130, 1131 of the master field register sequencer 275 on a bus line 323, separate lines 1050–1053 carrying the high order address and separate lines 1054–1057 carrying the low order address. The buffer 844 outputs the high order address on lines 1060–1063 to a 74LS170 ic component register memory 1110 and the low order address on lines 1064–1067 to a 74LS170 ic component register memory 1111.

Data is output from the master record register 100 one character at a time on a bus line 318, separate lines 1540–1547 to the I/O drivers 260 CPU 70, and ASR field 203.

Figure 12:
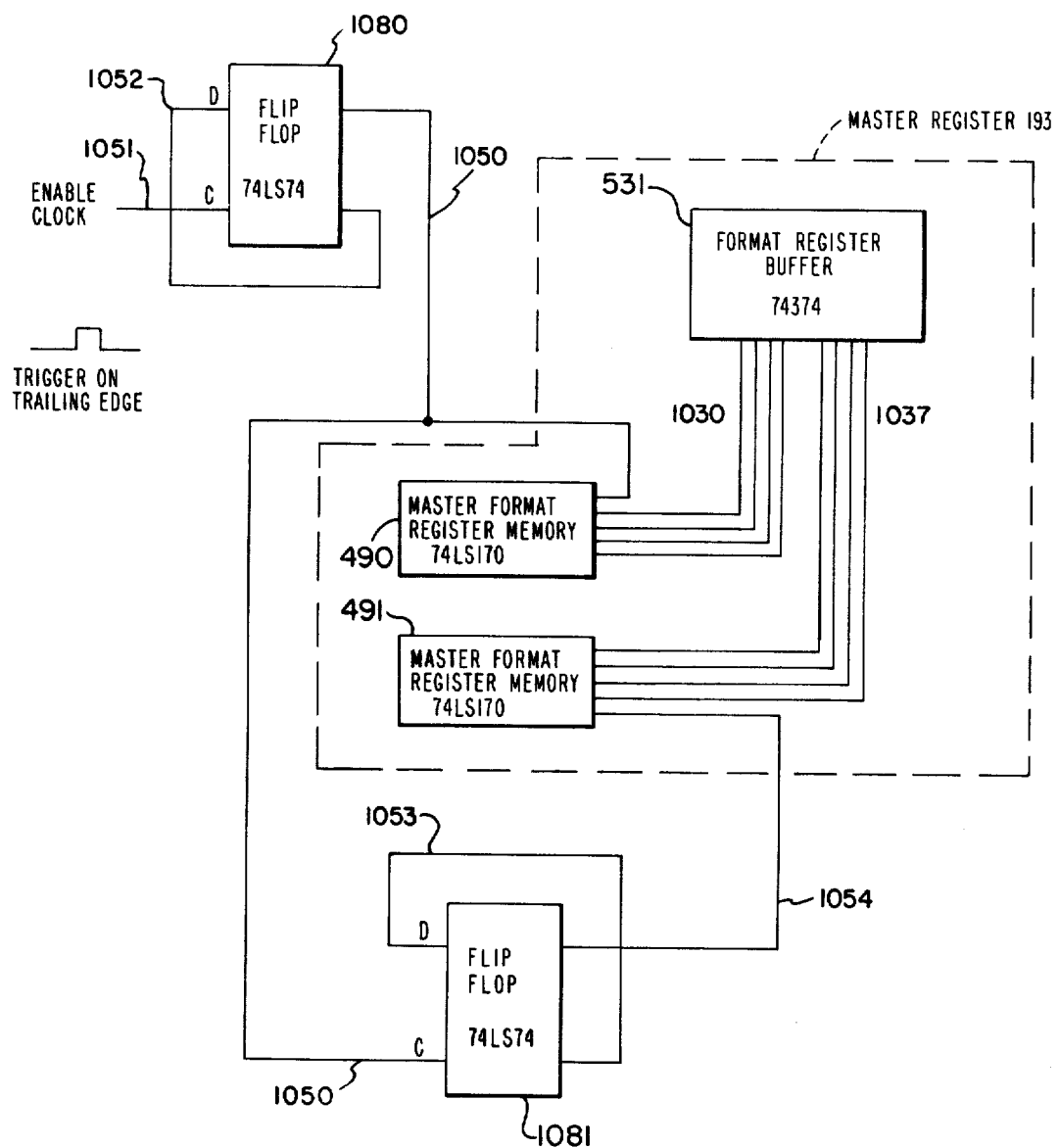
FIG. 12 shows the select logic, the format address select flip-flops for the format registers.

FIG. 12 shows the two C-D flip flops 1080, 1081 that transmit bits of address signal that select the four bytes for the master register 193 and display register 196. The flip flop 1080, a 74LS74 ic is triggered on the trialing edge of the clock pulse input on a line 1051 from the master timing 70. The data input to the low order master format register memory 490 on a line 1050 is the zero output on the same flip flop 1080. The result of this configuration is that the low bit of address input on a line 1050 into the format register memory 490 changes every clock pulse out of the master timing 70.

The clock of the second C-D flip flop 1081 is driven by the output from the first flip flop 1080 on a line 1050. The duty input to the high order address flip flop 1081 is the zero output of the same flip flop 1080 on a line 1053. The result of this is a signal on a line 1054 that changes the address to the high order master format memory register 491 every second enable from the master timing 70 accessing four sequential address locations creating four bytes of format from one displacement location given in the display format from the display ASR 202.

Figure 13:
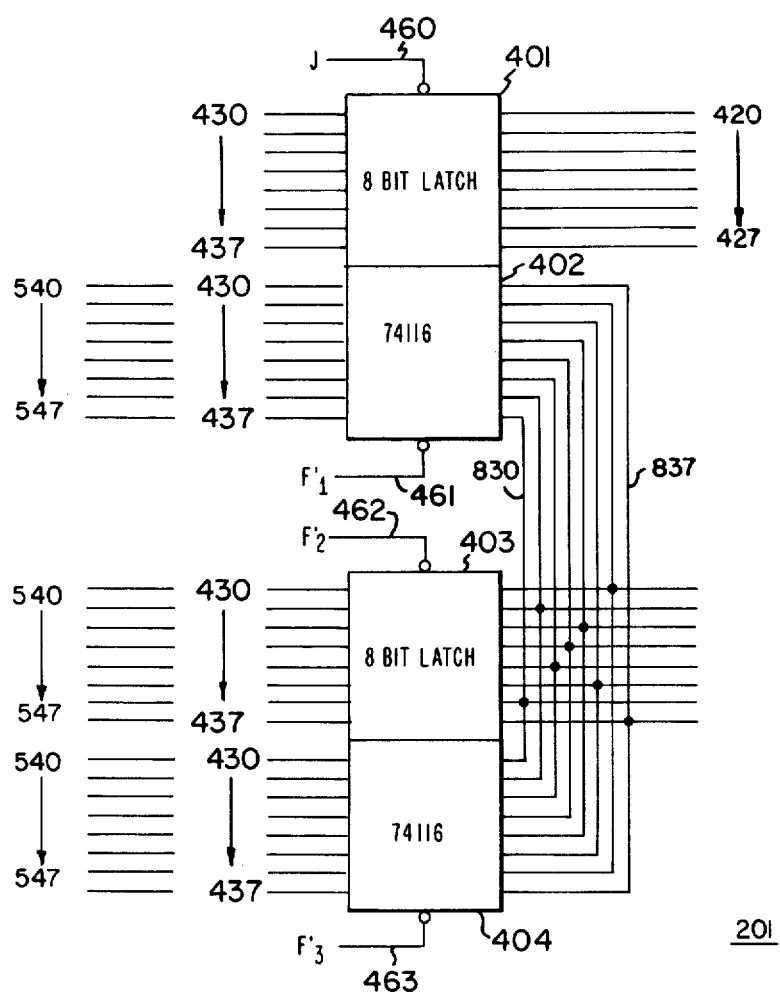
FIG. 13 shows the circuitry comprising the master data in active status register that stores the selected field data format.

FIG. 13 shows the master ASR data in 201 which latches the four data format bytes of master format information that come from the master format register 193. The first latch 401 a 74S412 ic when enabled on a line 460 receives an input on bus lines 430–437 and on bus lines 420–427 outputs the field format information including alpha or numeric characteristics, leading or trailing spaces, one to five or floating decimal places, and upper or lower case information.

The second latch 402 when enabled on a line 461 receives input on bus line 317/lines 430–437 and/or outputs on bus lines 830–837 signals representing the data field length in number of characters.

The third latch 403 ic when enabled on a line 462 receives input on bus line 317/lines 430–437 and or outputs on bus lines 830–837 signals representing the high order displacement of the data field selected by the master format and stored in the data field ASR 203.

The fourth latch 404 when enabled on a line 463 receives input on bus line 317 lines 430–437 and/or outputs on bus lines 830–837 signals representing low order displacement of the data field selected by the master format stored in the data field ASR 203.

The master format instruction output from the first latch 401, determines field configuration.

Some other field configurations are leading spaces. All data is stored on the disk in the alphabetic configuration with trailing spaces or packed numeric leading spaces. For the purposes of output on the terminal screen 26 or line printer 27 additional features that characterize the fields may be indicated, in the instruction and terminal decoders implemented. Some others are a numeric field with one, two, or three digits an alphabetical field with upper case print, an optional alphabetic field definition that can be altered with software microcode to generate different sizes and styles of face on different reports: a numeric field definition to producing leading zones, variable decimal points, or round numbers. In this way, the Master ASR—Data in 201 generates codes that define the configurations of data within a field, both the way it is input and the way it is output, permitting variations in the data presentation between input and output, or for output to different periferal devices. This data can be entered on the keyboard 30 without decimal points, but output through the CRT space 26 or printer 27 with the decimal in the correct place. It is all a matter of field definition, two fields can be defined in the same location, one with decimals and one without. The operation calls the appropriate field.

Figure 14:
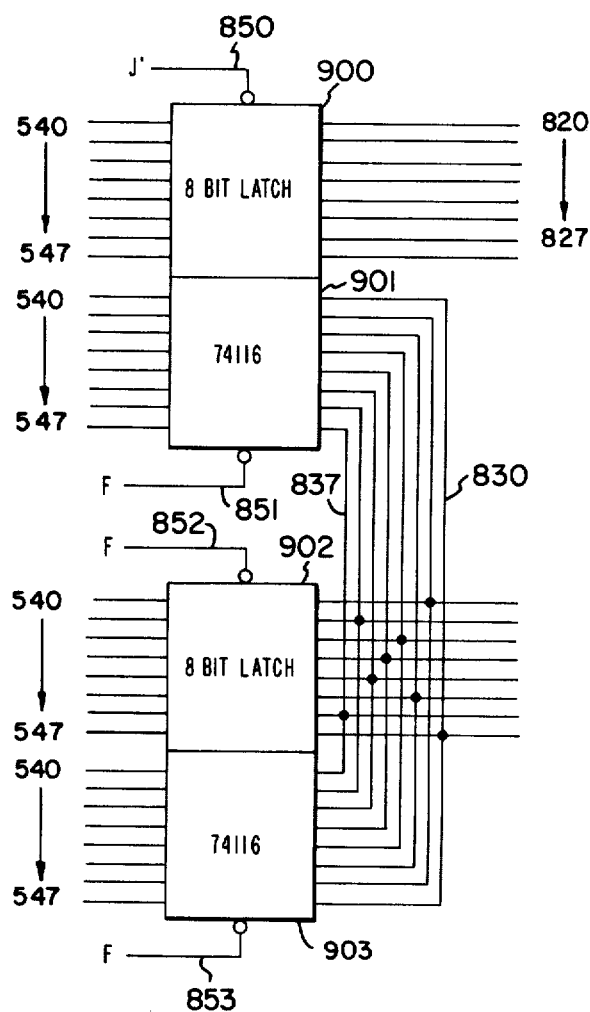
FIG. 14 shows the circuitry comprising the display data-out active status register that stores the current instruction set operation.

FIG. 14 shows the ASR data-out 202 which stores bytes of the display register 196, in the four latches 900 901 902 903.

The first latch 900 when enabled on a line 850 receives input of the format instruction signals on a bus line 314/lines 540-547. This latch 900 is the instruction register that sends the instruction code as outputs on bus lines 820-827. Data input to the other three 74116 latches 901 902 903 on lines 540-547 contain master or display former numbers. The format is a number from one to 256 that references a format on the master register 193 or display register 196, i.e. three format numbers are associated with a format instruction and together they comprise enough information for the machine to execute an operation, output on lines 830-837.

Figure 15:
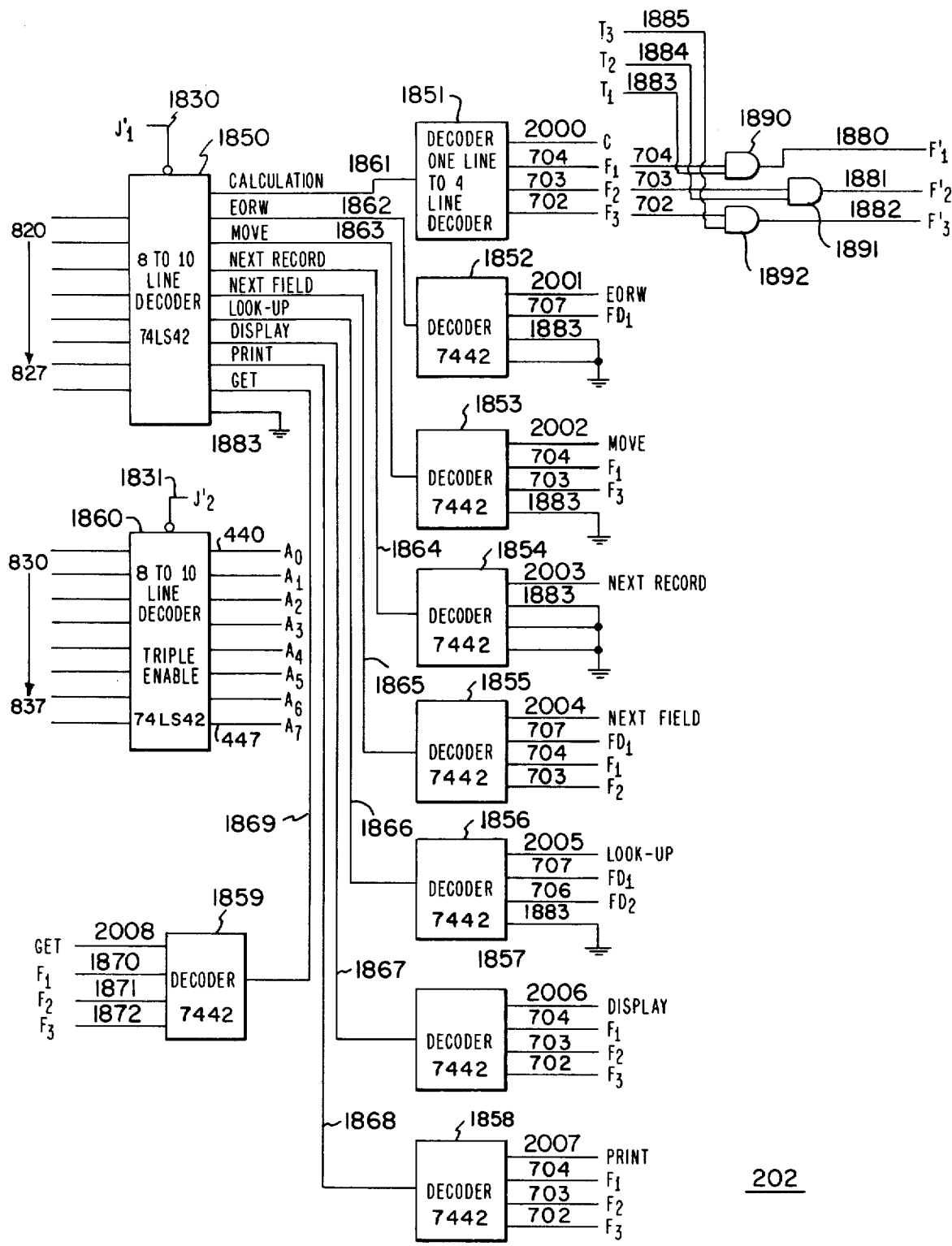
FIG. 15 shows alternate implementation circuitry for the display data-out active status register, providing 5 distinct operation struction set signals.

FIG. 15 shows an alternate implementation of the display ASR-Data Out 202 that implements output of enable signals to select master fields or display fields associated with a particular display format instruction. Some instructions operate on fields, some instructions jump to another display format location, and some combine both functions. The central instruction of the display format is output from the instruction register latch 900 as a signal on lines 820-827 to a 74 LS 42 8 to 10 line decoder 1850 that when enabled on a line 1830 outputs the selected instructions.

The calculation instruction is output on a line 1861 to a decoder 1851 which outputs a calculation enable signal on a line 2000 to the function generator ROM 57 in the enable logic 279, a master field enable signal, on a line 704 indicating selection of the first set of latches in the ASR data field 203, a master field enable signal on a line 703 indicating selection of the second set of latches in the ASR master field 203, and a master field enable signal on a line 702 indicating selection of the third set of latches in the ASR data field 203. Enable signals $F_1$ $F_2$ $F_3$ on lines 703, 704, 703 are input to the enable decoders 1890, 1891, 1892 output on lines 1880, 1881, 1882 to the ASR data field 203 when selected by the timing 70.

The EORW instruction is output on a line 1862 to a decoder 1852 which outputs an EORW on a line 2001 to the function generator ROM 57 in the enable logic 279, a display field enable signal on a line 704 indicating selection of the first set of latches in the ASR data field 203, the other two outputs for the EORW decoder 1852 are tied to groung. The additional decoders shown 1853-1856 similarly transmit enable signals on lines 704, 703, 702 to the ASR data field 203. Field information is transmitted to the ASR data field 203 from a decoder 1860 on lines 440-447.

Figure 16:
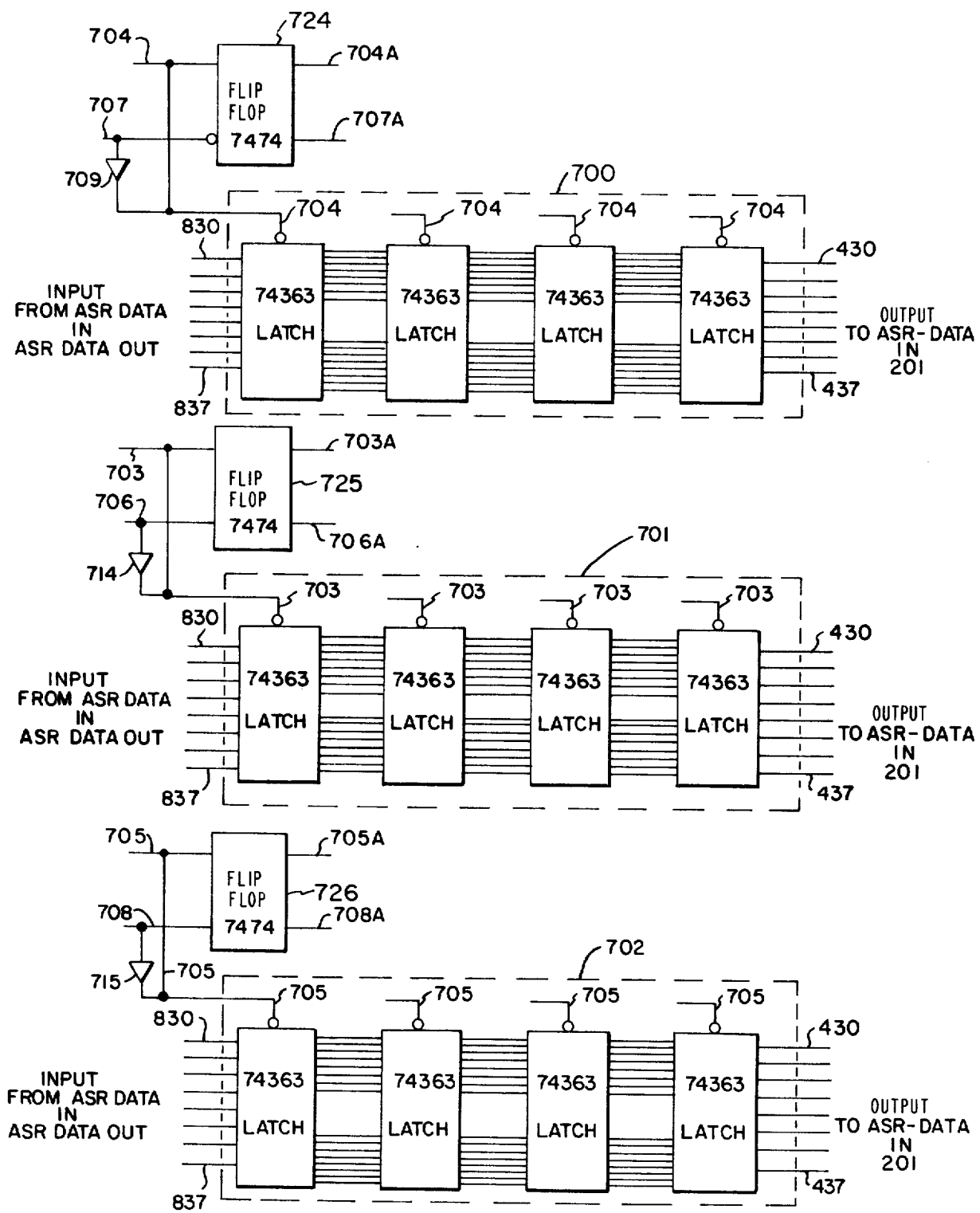
FIG. 16 shows the circuitry comprising the data field active status register that stores pointers to the actual data being entered into the computer.

FIG. 16 shows the data field ASR 203 used to hold signals contained in the formats, permitting access and interaction of up to three variable length fields. They are used to eliminate fixed length registers of state of the art computers.

The data in the data register 100 does not have to be moved so pointers for the purpose of moving data into operations registers do not have to be prepared because data is operated on in place. The RAM data field register 100 is not limited to fixed bit length of eight, sixteen, or thirty-two bits, fields are used as general purpose registers with operations performed directly on the fields up to the length of the entire RAM. Given a choice between a fixed length and a variable length register, the latter is more powerful. For example, instead of providing a fixed length operations register for calculations they can be performed in a field defined by a master format so that the machine if not bound by any particular bit length for operations on data, nor is the CPU speed slowed by excessively long registers. Only the space that is needed is allocated.

The three latches 700 701 702 simultaneously store all format information used in any particular operation. In combination with the register selection they permit implementation of a set up process where the user enters all characteristics of the variable length data fields, and then the sequence of one instruction operation at a time, e.g. all the fields affected by keyboard entry, then a calculations on fields, and then all fields displayed on the screen, then all fields printed, and so forth, finally entering test conditions, for each type of operation to be performed.

The storing of field information for three fields on which operations are performed, transforms operations on the data in those fields into a format that is understandable to ordinary people because field definition is made independent of operations, and operations are made independent of each other. Because the definition of the data is separated from the definition of the operations to be performed on that data and operations are performed directly on the data definition, not only can the data fields be defined apart from the operations to be performed on it, the operations can be simplified into step by step functions that are implemented as operations. The latches 700 701 702 serve as an indirect pointer to a data register. For example an addition is implemented as the sum of the data accessed by the information in latch one 700 and data accessed by the information in latch two 701 with the result placed in the data location indicated by the information in latch three 702. As another example, a comparison is made on the data pointed to by the format in the first latch 700 and data pointed to by the format in the second latch 701 with the display format counter reset to the format contained in latch three 702 if the comparison is true. In still another example, keyboard data entry, CRT display of data, or printing of data is always performed on the data pointed to by the format in the first latch 700, which is the only one used within these instructions.

Since the programmer does not have to load pointers to registers to be used for operations, the hardware does much of the bookkeeping for the programer. The instruction set steps through the display format in the ASR data out 202 once the set up has occurred and is stored in memory.

The data field ASR 203 consists of three sets of latches 700 701 702 $F_1$ $F_2$ $F_3$ or $FD_1$ $FD_2$ $FD_3$ (F=a master format, FD=a display format). All three latches 700 701A 702B receive input from the display ASR data out 202 on the same bus lines 830–837, but because they are enabled separately, on lines 704, 707, 703, 706, 705, 708 they receive separate field number data. There are three associated D type flip flops 724 725 726. The first flip flop 724 upon receiving a signal on line 704 from the ASR data out 202 sets the flip flop 724 high to indicate that the field number to be stored in the latch 700 is a display type, a signal on a line 707 resets the flip flop low to indicate that the field number to be stored in the latch 700 is a master type. They are used to indicate whether the field data is of the master or display type. These flip flops 724 725 726 are an alternate implementation. In the preferred implementation, the instruction decoder 57 and master timing 70 enable the latches 700 701 702 at the time that controls when information stored there is a master or display type field information.

The master format register 193 or display format register 196 outputs a format on the bus line 830–837. During the instruction operations used to generate sequential program code, and during the operation contained in the display ASR data out 202 the enable logic 279 sends an enable signal on a line 707 to the enable input of the first field latch 700 which when enabled accepts the format information.

The second latch 701 four 74363 ics in the field ASR 203 have an associated D type flip flop 725 which is set high on a line 703 from the enable logic 279 to indicate a display field number or is reset low on a line 706 from the enable logic 279 to indicate a master field number; the latch 701 is enabled by a signal on either of the same lines 703 or 706 when the signal on a line to reset the flip flop 725 is inverted by an inverter 714 and when enabled, the latch 701 stores the format to be used during the instruction operations contained in the display ASR-Data Out 202

Similarly the third set of 74363 ic latches 702 have an associated D type flip flop 726 set on a line 705 and reset on a line 708 to indicate the presence of master or display format instruction input to the latch 702 on separate lines 830–837 for the master 193 or display register 196 when the latch 702 is enabled on a line 705 or on the other line 708 through the inverter 715.

The three latches 700, 701, 702 make available the field definitions simultaneously, which the instructions decode in specified ways. While three latches 700 701 702 are used in the preferred implementation, other implementations may include many more data field latches.

There are several ways to achieve an apparent need for more than two operand fields and one result field: 1. by using successive operations, 2. by implementing more complex computation instructions in the code, and/or 3. by use of a calculator chip to provide for more complex operations.

The first latch 700 when enabled on a line 704 outputs stored field format information on bus lines 430–437 to the ASR Data in 201 when the associated flip flop 724 sends a high signal on a line 704A or to the ASR Data Out 202 when the flip flop 724 sends a low signal on a line 707A. In the same way the second 701 and third latch 702 when enabled on lines 703, 705 send field format information on bus lines 430–437 to the ASR Data in 201 when the associated flip flops 725, 726 send a high signal on lines 703A, 705A indicating Master field format information or to the ASR Data Out 202 when the flip flops 725, 726 send a low signal on lines 706A, 708A indicating display field format information.

Figure 17:
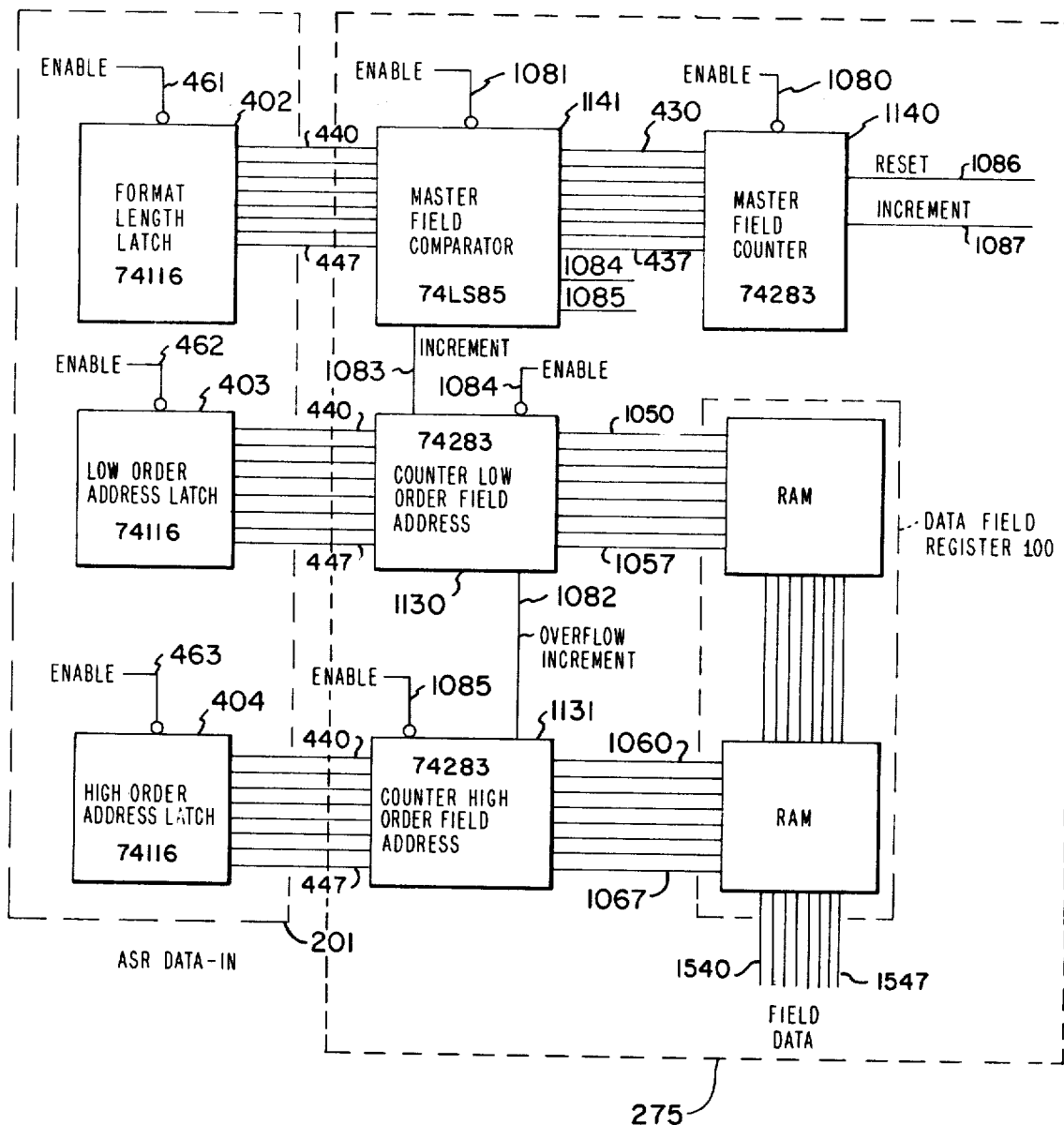
FIG. 17 shows the circuitry comprising the field register sequencer, a counter used to select data at random locations in memory.

FIG. 17 is a drawing of the field register sequencer 275 which is used to select the variable length register in RAM 100. It points to and permits access to the data field information in RAM 100, providing for operations on variable length data in place. The data fields are operated on one character at a time. As a character is operated on a counter 1140 sequences and compares the number of sequences to the designated number of characters in the field. When the counter 1140 and comparator 1141 are equal, the operation in the field stops. Two address counters 1130 1131 are used to access data one character at a time in RAM 100.

The master field register sequencer 275 recieves the signals from the ASR Data-In 201 containing the number of characters in a particular field, and the high and low order starting location in RAM 100. The sequencer 275 now is incremented to each location in RAM 100 designated within a field for the purpose of processing a character from the field. The field length comparator 1141 determines if the machine has processed the entire field. The advantage of this incremental means for processing field characters is that the characteristics of a field or characters within a field can be associated with the master field definition that is easily located via the system of permanent numbers assigned to field locations. The characteristics of the field are associated with the field definition, particularities and singularities of the field can be changed by changing field definition without changing operations on that field.

The master ASR-Data In 201 outputs the three bytes of data to the master record sequencer 275 from three latches 402, 403, 404 which output format signals on the same bus lines 440–447 at different times, controlled by the independent enable signals on separate lines 461, 462, 463. The field length latch 402 when enabled on a line 461 outputs on the bus lines 440–447 to the master field register counter 1140 which is enabled on a line 1080 from the enable logic 279 and on the same bus lines 440–447 to the master field register comparator 1141 which is enabled on a line 1081 from the enable logic 279. The low order address latch 403 of the master ASR Data-In 201 when enabled on a line 462 outputs on the same bus lines 440–447 to the master field low order address counter 1130 which receives the low order RAM address of the starting location of a data field when the counter 1130 is enabled on a line 1084 from the enable logic 279. The high order address latch 404 of the master ASR Data-In 201 when enabled on a line 463 outputs on the same bus lines 440–447 to the master field high order address counter 1131 which contains the high order RAM address of the starting location of a data field when the counter 1131 is enabled on a line 1085 from the enable logic 279.

Once the master field data has been loaded from the master ASR Data-In 201 into the master field register sequencer 275 the master field counter 1140 is reset to zero on a line 1086 from the enable logic 279. The address counters 1130, 1131 wait for an enable signal from the enable logic 279 on lines 1084, 1085 before they output on bus lines 1050–1057 1060–1067 the data field address to RAM 100. When enabled on a line 1084 the low order address counter 1130 outputs on bus lines 1050–1057 and high order address counters 1131 when enabled on a line 1085 outputs on bus lines 1060–1067 the starting field address to the master record register RAM 100 which outputs the first character of the field on bus lines 1540–1547.

The enable logic 279 sends a signal on a line 1087 which increments the master field register counter 1140 by one and outputs on bus lines 430–437 the number in the counter 1140 to the comparator 1141. If the two numbers are equal, the comparator 1141 sends a disable signal on lines 1084, 1085 to the enable logic 279 indicating all the characters in a field have been processed. If the number in the master sequencer 1140 and in the master comparator 1141 are not equal, the comparator 1141 sends a signal on a line 1083 to the low order address counter 1130 which increments the counter 1130 by one. If there is an overflow the counter 1130 sends a signal on a line 1082 to the high order address counter 1131 incrementing that counter 1131 by one. The counters 1130, 1131 are activated by signals on enable lines 1084, 1085 from the enable logic 279 which select the next field character from the master record RAM 100 and process that character, inputting or outputting the character on lines 1540–1547 if necessary.

Figure 18:
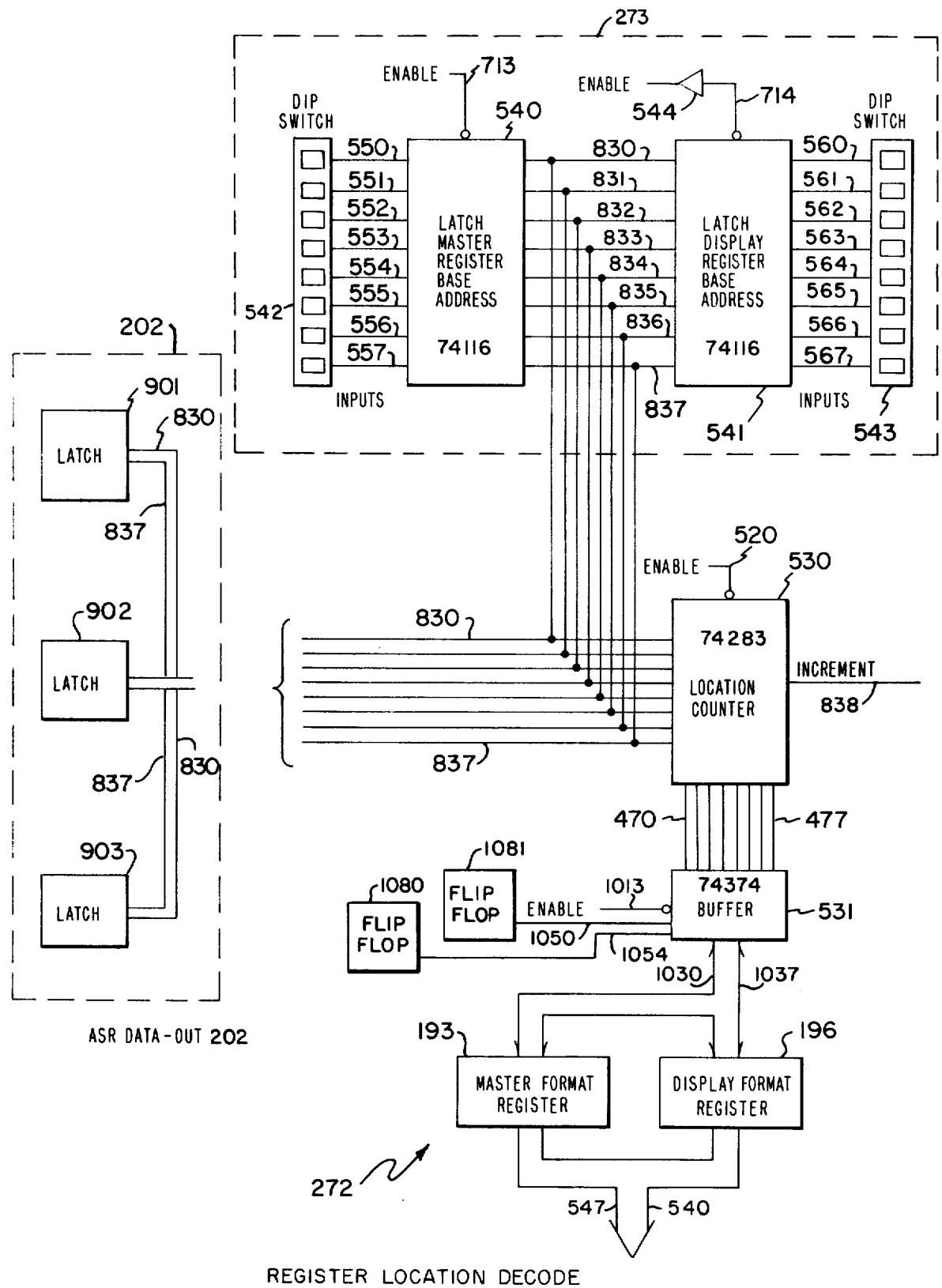
FIG. 18 shows the register location decode circuitry, a set of sequencers used to select the master and display format signals from the master format register and display format register.

FIG. 18 shows the register location decode 272 used to select the master and display formats from the master register 193 and the display register 196. The register decode 272 presets a counter 530 to an arbitrary origin using a signal from latches 540,541 on lines 830–837. The enable logic 279 provides an enable signal on a line 713 to a 74363 ic latch 540 which has inputs on lines 550–557 tied to a designated starting location, dip switches or header 542. It outputs on lines 830–837 to preset the register location decode counter 530 a 74283 ic to the base address, the starting displacement, for the master format register 193.

Lines 560–567 tied to a dip switch or header 543 input the base address for the display register 196 into a latch 541 when it is enabled from enable logic 279 with a signal on a line 714 through an inverter 544. Lines 830–837 from the latch 541 output the master base address to the register location decode counter 530, a 74283 ic. The counter 530 permits random access to any of the 256 four byte formats which are assigned permanent sequential numbers from one to 256 by virtue of their sequential location in the format registers 193 196.

After the base address is input to the counter 530, the field number entry signal from the ASR data out 202 is transmitted on bus lines 830–837 to the register location decode counter 530 a 74283 ic which when enabled on a line 520 outputs on lines 470–477 to a buffer 531 a 74374 ic which when enabled with a signal on a line 1013 stores an 8 bit address of the master format. The two flip flops 1080, 1081, part of the format register decode logic 272 when enables, provide two bits of select logic and permit the master 193 or display register 196 to put out four bytes of format. The buffer 531 when enabled on a line 1013 sends a signal on bus lines 1030–1037 to the master format register 193 and display format register 196 which output format data from the addressed portion of the memory register 193 196 on bus lines 540–547 to the ASR data-in 201, ASR data out 202, or on lines 830–837 to the ASR field 203, through the other two ASR's 201, 202 which ever is selected by the enable logic 279.

Figure 19:
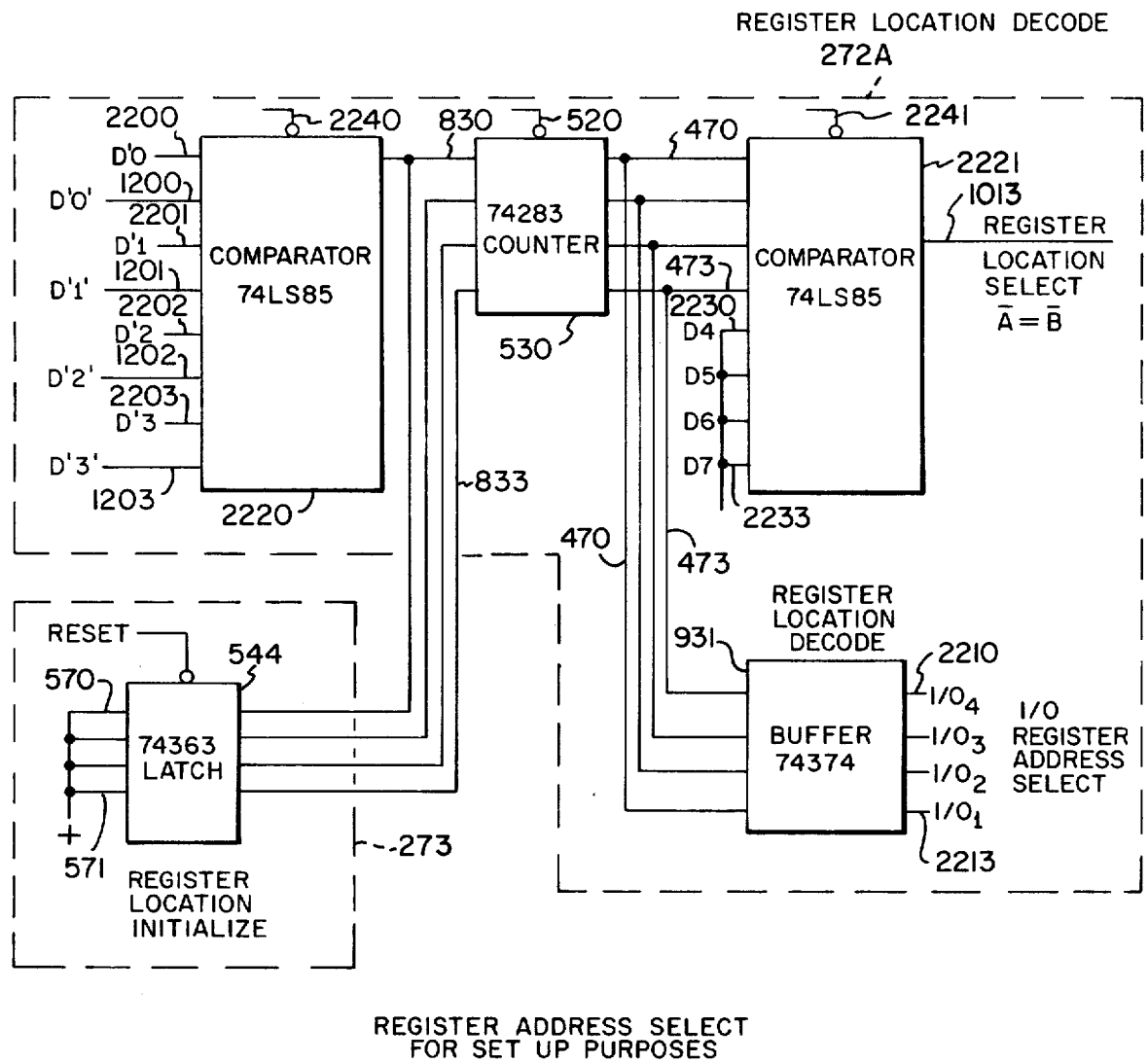
FIG. 19 shows circuitry comprising an alternate implementation of the register location decode that can be used to generate format register select address used for program set-up purposes.

FIG. 19, an alternate implementation of the register location decode 272A, shows a latch 544 used to set the location counter 530 with signals on lines 830–833 to the base address of the I/O register 191. The counter 530 outputs the base address plus the character location on lines 470–473 to the register location decode buffer 931 which outputs the I/O register address that selects the location of the next character on lines 2210–2213. Though four lines are shown, eight or more may be used.

The comparator 2220 receives inputs of lines 2200–2203 from the keyboard decode 38 and another from the counter selection latch 39 on lines 1200–1203. When the inputs are the same the comparator sends a signal on a line 830 to increment the location counter 530. The initalize comparator 2221 is preset to a number on lines 2230–2233 from the enable logic 279. The location counter 530 outputs on lines 470–473 to the initalize comparator 2221 which when it is enabled on a line 2241 compares the number in the location counter 530 to the enable number and if they are the same, a register location select enable signal is generated on a line 1013 and enables the master format buffer 531. In this way set-up data can be input directly to the master format register 193 from the keyboard 30.

Figure 20:
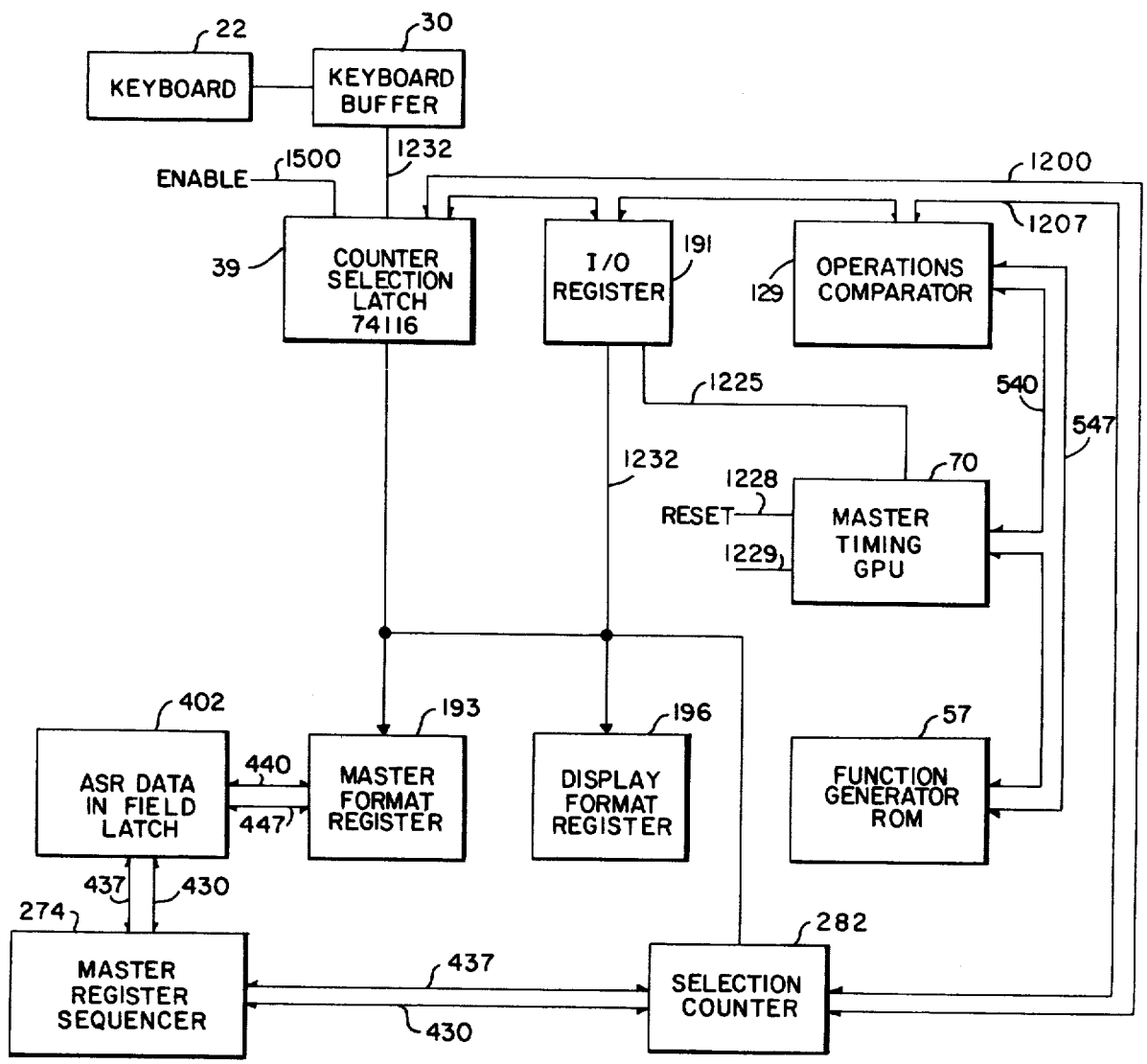
FIG. 20 shows the circuitry for entity of format data into the format registers.

FIG. 20 shows the means for entry of format data into the format registers. Characters are entered through the keyboard 30, held in the counter selection latch 39, processed in the selection counter 282, and input into the appropriate format register 193 196. The system is reset by a signal on a line 1228 to the master timing device 70; the set up key puts the machine in a state ready to receive format information. The keyboard buffer 30 sends the next selected key signal on a 1232 to the selection latch 39 which when enabled on a line 1500 outputs the signal on bus line 306/lines 1200–1207 to an operations comparator 129 which also receives input from the function Generator ROM 57 when which when enabled a line 540 from the master timing device 70 outputs a set up flag on a bus line 540–547 to the operations comparator 129 also enabled on lines 540–547 from the CPU master timing 70 which then compares the keyboard entry to the setup mode and a step by step set up process is initiated.

Henceforth, each keyboard entry is compared to a set of flags from the function generator ROM 57 in the manner just described. These flags described in FIGS. 5 and 7 can initiate new sequences, rub out characters, or cause the termination of sequences previously initiated. When the field terminator key is entered, the operations comparator 129 sends a signal on the CPU bus lines 540–547 to the master timing 70 which sends an enable signal on a line 304 to the selection counter 282 and master ASR 201. The selection counter 282 is reset on a line 1223 at the time each field is terminated, after the number in the counter has been entered in the master ASR 201 in the field length latch 402 and stored in the master register 193 as the second byte of the next sequential master field number.

In the set up process each keyboard entry sends a signal on a line 304 to the selection counter 282 as the characters in a field are entered in the keyboard 30. When the field terminator key is entered, the number in the selection counter 282 is sent on a bus line 302/lines 430–437 to the master ASR latch 402 that contains the data field length. From there the length is sent as a signal on lines 440–447 to the master format register 193 when locations are selected by signals on a line from the master register sequencer 274.

In this way the field length and the display address can but need not be entered from the keyboard; the user spaces along the display to choose the number of characters desired in a particular field. These numbers can also be entered directly from the keyboard as a number using the decimal/hex setup flags.

In a similar manner, all the format information for the master and display registers can be entered through the keyboard 30 either through the I/O register 191 using the set up process that enters operation separately, or directly into the master or display register 193 196. The set up process tests for continuity of a step in the operations comparator 129, and when there is a terminator stores the format in the master format register 193 or display format register 196.

One use of the I/O register 191 is to set up formats for the number of spaces across the rows of the CRT and printer, or number of lines down the screen or page; the cursor is used to set up the exact starting location of each field entry, display or printout sending signals in the same way to the selection latch 39, selection counter 282, ASR 201, and display format 196. The get, display, and print flags initiate keyboard entry into the I/O register 191. The get key when entered on the keyboard will compare equal to the get flag in the operations comparator 129, which sends a signal on the internal CPU bus 540–547 to the master timing 70 which sends an enable signal on a line 1225 to the enable the I/O register 191. At that time, all characters typed until the terminator key are stored sequentially in the I/O register 191.

The I/O register 191 is designed to meet the need for storing a whole screen full of data and referencing that as part of the setup process.

At that time, all characters typed until the terminator character define characteristics within or operations on a field. Characters are stored in the I/O register 191 and are used to indicate the beginning of each new field within both rows and lines. They are also used to indicate characteristics of field including type size, a number decimal places, alpha or numeric characteristics, and so forth depending on the setup step number being processed.

Figure 21:
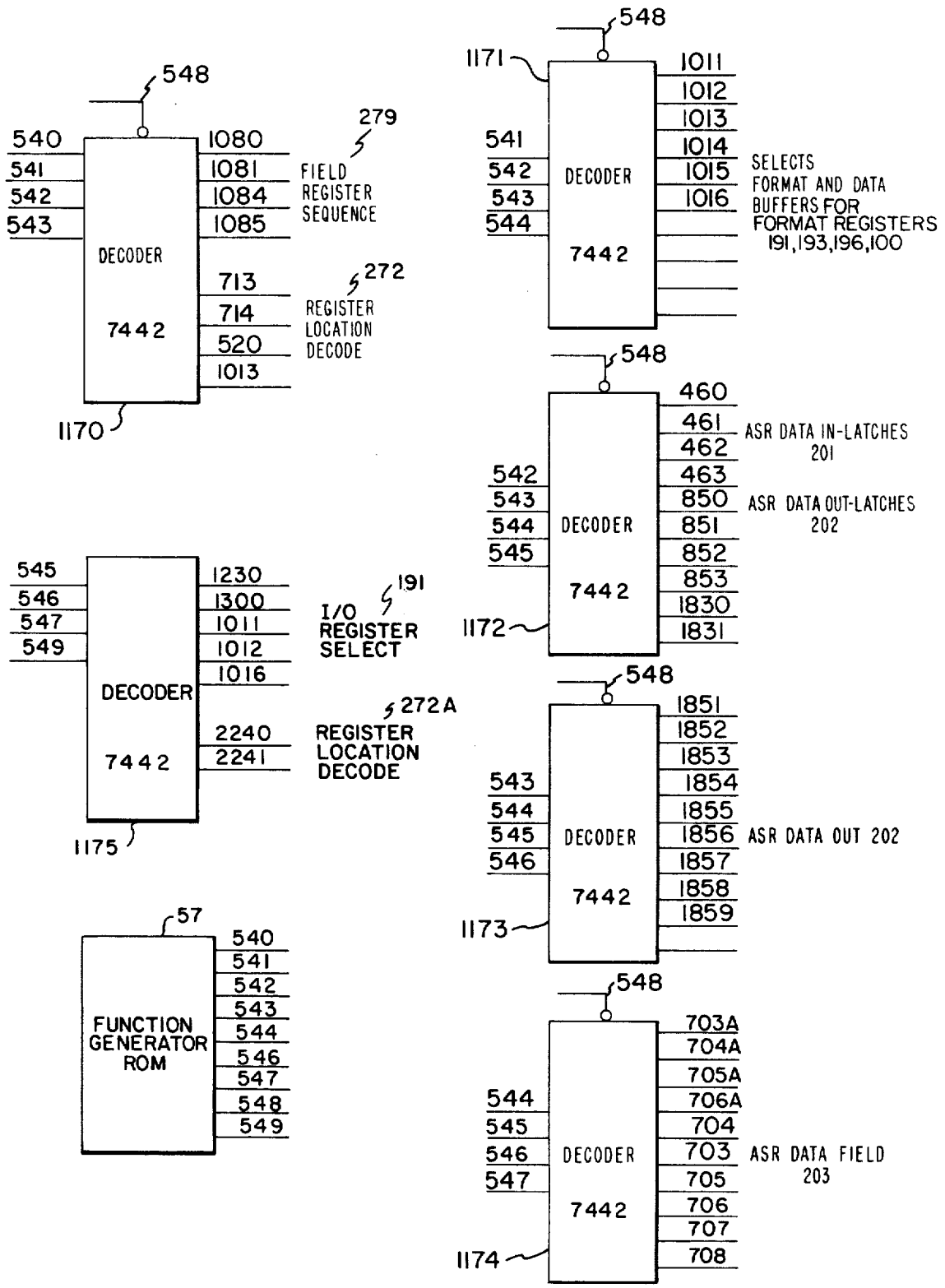
FIG. 21 shows circuitry comprising the enable logic used to control selection of most of the module components used in the sequencers, format registers, and active status registers.

FIG. 21 shows the enable logic 279 which sends signals used to enable the ASR latches and the sequencer latches, counters, and comparators shown in FIGS. 11–22. The function generator ROM 57 sends signals on the bus lines 540–543 to the decoder 1170 which is enabled from the ROM 57 on a line 548 and outputs enable signals to the field register sequencer 275 on lines 1080 1081 1084 1085 to select format address locations in the format registers 191 193 196.

The decoder 1170 also sends enable signals to the register location decode logic 272 on lines 713 714 520 1013 to selectively enable the base address registers 540 541 and the register location counter and buffer. These enable signals on lines 713 714 520 1013 permit selective activation of the master or display format address bus, thereby permitting use of the same location counter for any format register.

The decoder 1171 when addressed on lines 541–544 from the function generator ROM 57 selects format and data buffers for the format registers 191, 193, 196, 100 on lines 1011–1016. These format registers, while permitting simultaneous formatting of data in n-dimensions, are accessed sequentially by the enable logic, thereby permitting n-dimensional programming using linear logic implementation.

The decoder 1172 when addressed on lines 542–545 from the function generator ROM 57 selects ASR data In 201 and ASR Data Out 202 latches on lines 460–463 850–853 1830–1831. The ASR data In 201 latches control the master field format definitions of linear data coming into the system for bulk storage on disk drives 23 and subsequent access to that data. Multiple levels of ASR data In 201 permit multi-dimensional formatting of lines of data coming in. For example, air transport data from several different airline companies American Airlines, TWA, United, may come into a travel agency from several different types of computer, DIGITAL, IBM, Honeywell. Though each set of information is substantially the same, it is formatted differently regarding field length, and communication transmission code. Using separate master format registers 193 for each type of transmission permits n-dimensional formatting at the applications level of the computer hardware. The ASR data out 202 latches control the display field format definitions of n-dimension data going out of the system to printers 27, video display terminals 21, graphics units 21, and bulk storage devices 23. In these core data must be laid out horizontally and vertically, or in other dimensions such as record length.

These enable lines 1830–1831 460–463 850–853 permit selective access to registers that are holding specific kinds of format information, thereby aleviating the programmer of the tedious task of assigning general purpose registers special purposes.

The decoder 1173 when addressed on lines 543–546 from the function generator ROM 57 selects decoders 1851–1859 within the ASR data Out 202 that latch the display format type, e.g. look-up, next record, display, print, etc. These format types provide the essential functioning of the computer, providing as assembly language code instructions that relate to what ordinary people need to do to their data with a computer rather than complex register instructions such as move immediate, substitute register A for B etc.

The decoder 1174 when addressed on lines 544–547 from the function generator ROM 57 selects latches 700–702 in the ASR Data field 203 on lines 703–708 703A–706A providing enable signals that select field format information used in the display format instruction being decoded by the ASR Data Out 202.

The decoder 1175 when addressed on lines 545–547 549 by the function generator ROM 57 selects buffers in the I/O Register on lines 1230 1300 1011 1012 1016. This register is used during the set-up process, and the separate enable signals permit selective use of this part of the logic for a sequential entry sequence, of step by step set-up of the computer program that is more like set-up of a mechanical machine than a linear computer program, because the linear aspect is gone and the computer user only has to deal with essential functions one at a time.

Figure 22:
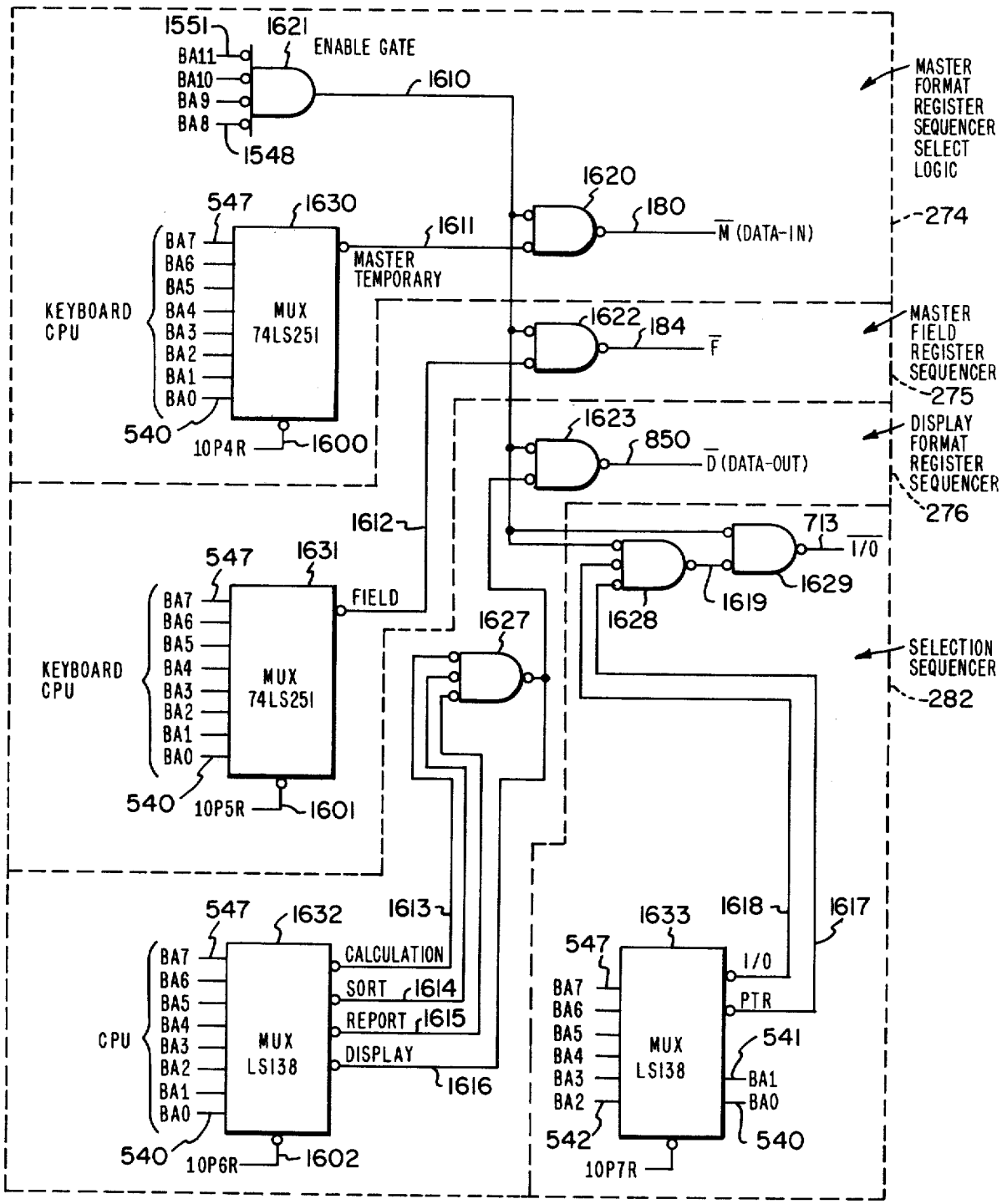
FIG. 22 shows circuitry comprising the register select logic using multiplexers to enable all the logic for the format registers I/O registers and RAM.

FIG. 22 shows alternate implementation select logic 279 using multiplexers to enable all the logic for the master format register 193, the display format register 196, the master record RAM 100, the I/O register 191.

In this case all the enable gates 1620 1622 1623 1627 1628 1629 are enabled by a signal on a line 1610 input from a gate 1621 which is enabled on lines 1548–1551 from the format select logic ROM 57. The format select logic ROM 57 outputs signals on bus lines 540–547 to a multiplexer 1630 which when enabled on a line 1600, outputs a master enable signal on a line 1611 to a two input and gate 1620 which outputs an enable signal on a line 180 to all the enable logic 279 for the master format register 193 and Master ASR 201.

The format select logic ROM 57 outputs a signal on a bus line 540–547 to a multiplexer 1631 which when enabled on a line 1601 outputs a field enable signal on a line 1612 to a two input and-gate 1622 which outputs an enable signal on a line 184 to all the enable logic 279 for the master record register 100 and the Data field ASR 203. Likewise multiplexers 1632 1633 enable all logic for the display record register 196 and master record register 193.

Flow Chart of Sequential Operation

Figure 23:
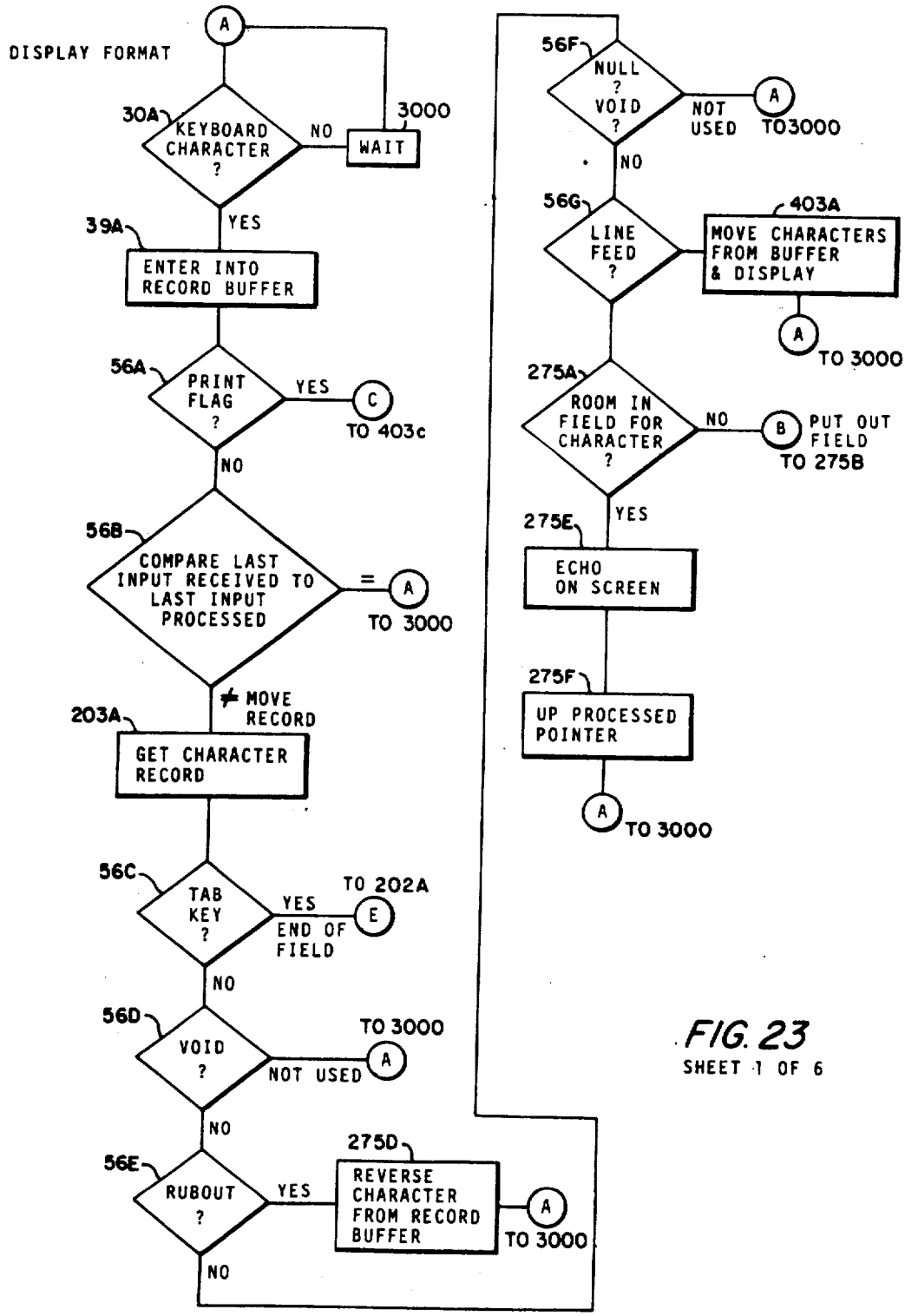
FIG. 23 shows a flow chart of sequential operation on six sheets.
Figure 23:
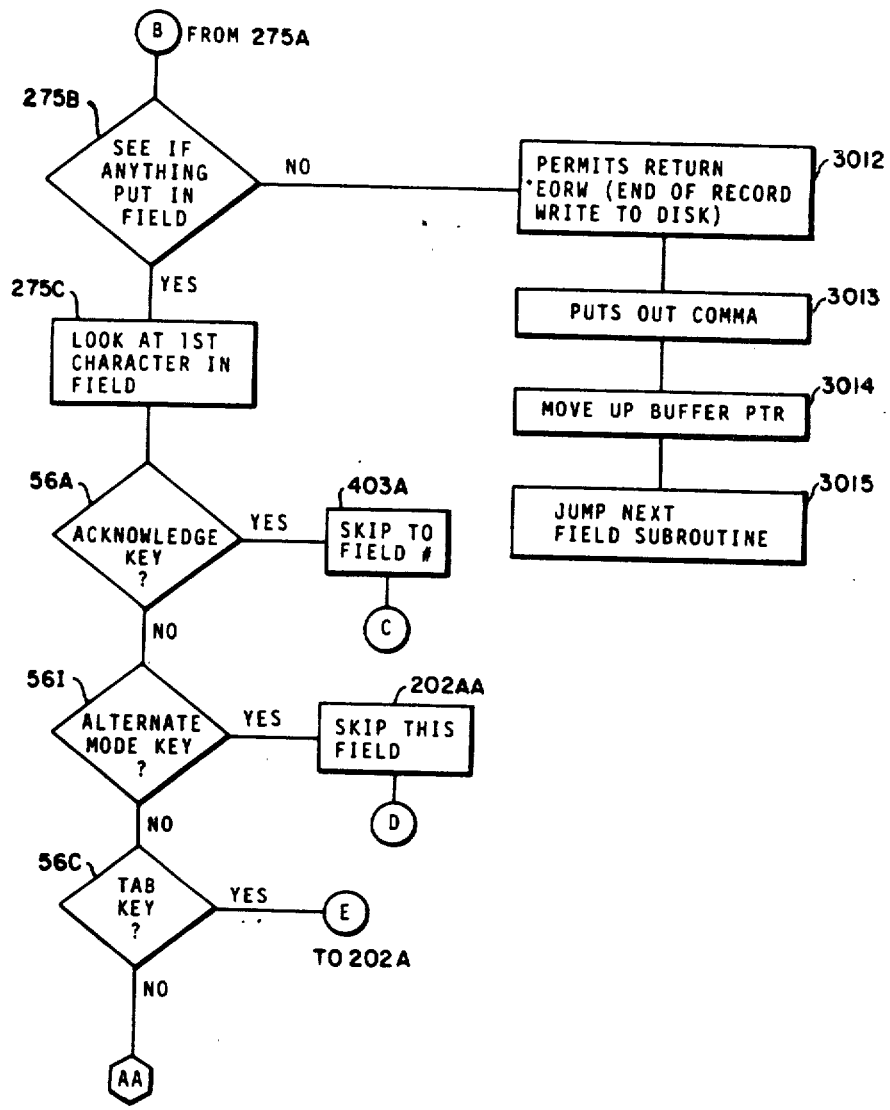
Figure 23:
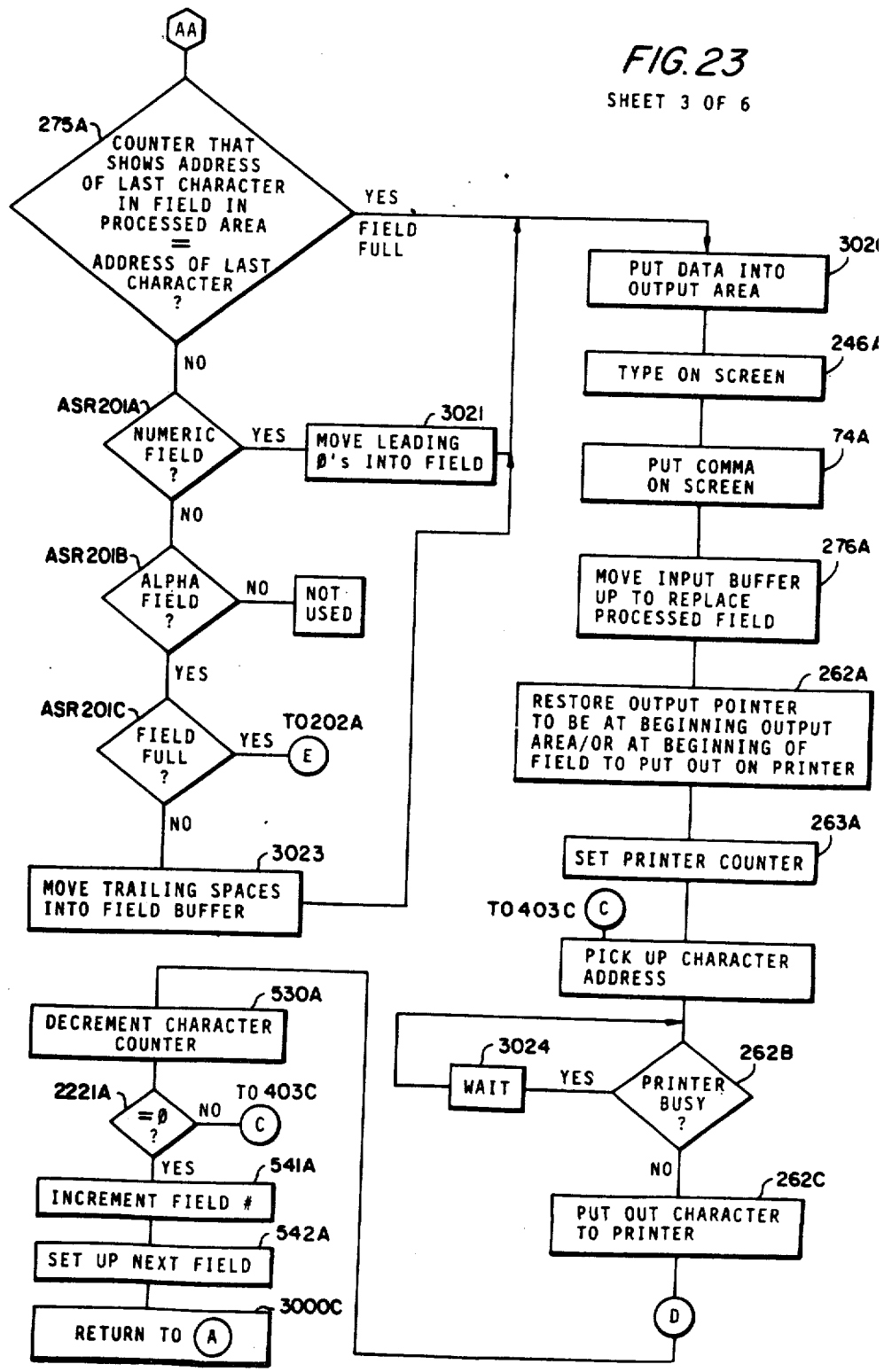
Figure 23:
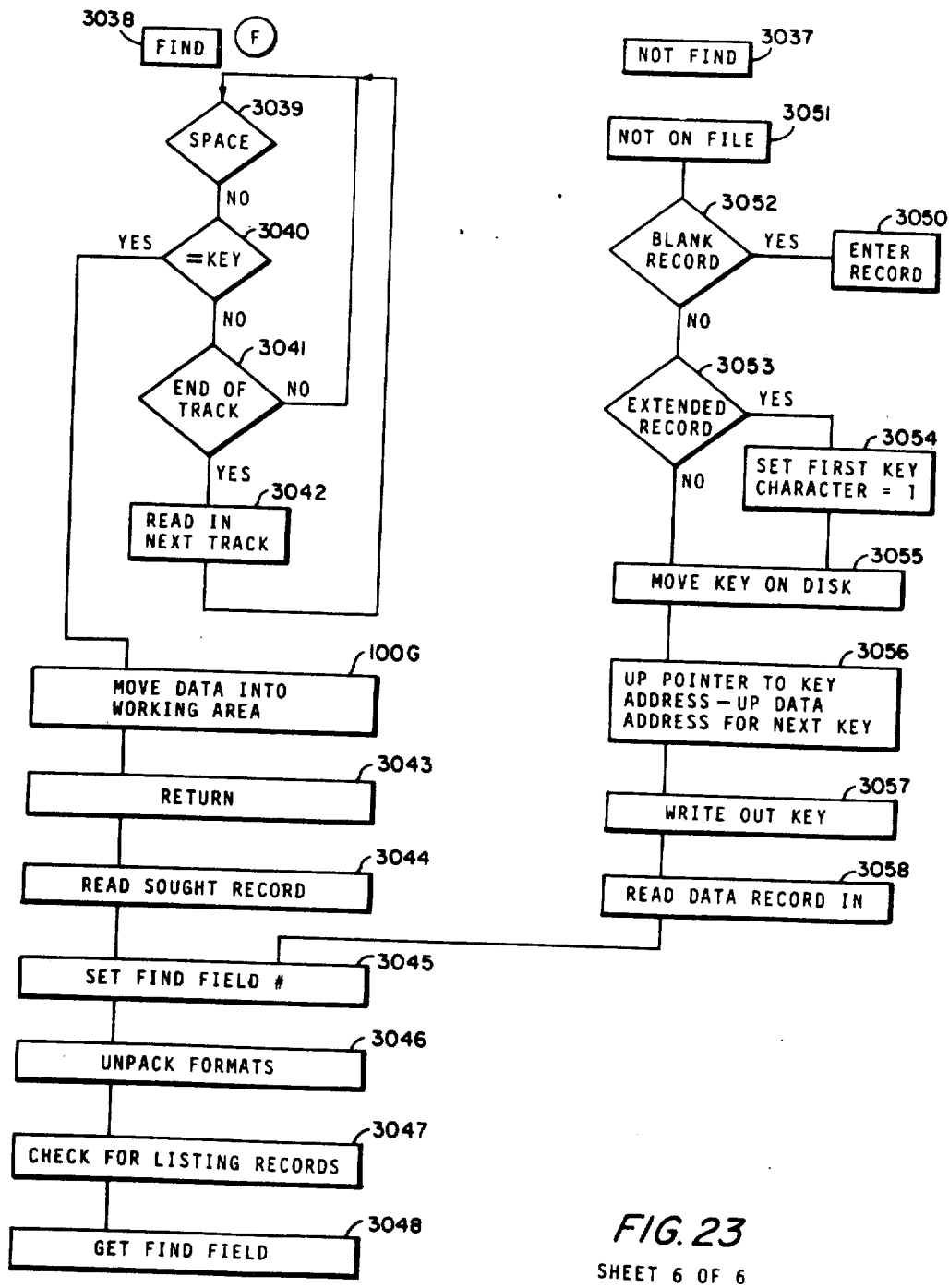

FIG. 23 shows a flow chart of sequential operation. The invention relates to a series of counters, dependent and independent index redgisters, and ASR's that pick up variable length data fields, one character at a time from another register or RAM. Instructions operate on data one character at a time, in place, in variable length registers defined independently of the operations. The flow chart in FIG. 23 shows how operations are independent of each other, how data field definitions are independent of operations, and describes typical interactions between the instruction set and the logic means.

It gives a description of how the system works when a key signal is entered and processed in the various registers and the sequence of events that occur to create a varaible length register.

Before any operations, the machine enters a wait State 3000 until a signal from the keyboard 30A is set to the record buffer 39A. The function flag comparator 56A checks to see if there is a print character, if the printer it to be activated. If so, the character is output to the print register 403C, if not, the function flag comparator 56B checks to see if there is a new character from the keyboard 30A.

If there is no new character, the system goes back to the wait state 3000; if there is a new character the system picks up the field from the ASR data field 203A. There the system checks in the function flag comparator 56C for a tab field terminator key signal if it is, this indicates the end of the field, and the system proceeds to get the next field from the display ASR 202A. If there is no field terminator tab key, the system checks for a rubout character 56E, which if it 56E is, removes the previous character from the field in the record 275D and returns to the wait state 3000 or next keyboard entry. If it is not a rubout key 56E, the system compares the key to the line feed flag in the function flag comparator 56G and if it is, moves the characters out to the display or printer 403A, goes to a new line 403A and returns to wait for a new key from the keyboard 3000.

The void 56D and null keys 56F are not used in this preferred implementation. If none of these flag keys 56A-56G have been entered on the keyboard, the system checks to see if the current field is full using the field register sequencer 275A, if so, it proceeds to the sequencer that puts out the field 275B. If the field is not full, the key entered is echoed in the screen or printer 275E, the processed pointer is incremented 275F and the system returns to the original wait state 3000, waiting for an entry on the keyboard.

When a field is empty 275B, a return key will cause the record and key to be erased from the disk if all field are empty 3012, a comma to appear on the screen indicating the end of the field 3013 incrementing the buffer pointer 3014 and the system proceeds to set up the ASR registers with the information from the next display format 3015 by incrementing the next field latch.

If the filled field is not empty 275B the system looks at the first character in the field 275C to see if it is the acknowledge key 56H if it is, the system puts that character out to the printer immediately 403A if it is not, an acknowledge key, it checks to see if the first character in the field is an alternate mode key 56I and if it is, the system skips this field entirely and moves to the sequence that as sets up a new field 202AA.

If it is not the alternate mode key 56I the system checks to see if the first character is the tab key 56CC, if it is, this indicates the end of the field, and the system proceeds to get the next field 202A. If it is none of these keys, sheet 3, the system compares the address of the last character in the field to in the process area, to the master field register sequencer which contains the number of characters that have been put in the field 275A. If the number of characters in the field is equal to the address displacement of the last field character in the comparator, the field is full and the field data is moved into the output area 3020. If the field is not completely full of characters, the system checks to see if it is a numeric field, ASR 201A which if it is, it moves leading zeroes (or spaces) into the field 3021 and moves the field data to the output area 3020. If the field is not numeric, ASR 201B the system moves trailing spaces into the field buffer 3023 and moves the field data to the output area 3020.

At the output buffer 3020 the field data is displayed on the screen 246A with a trailing comma 74A, the input buffer is incremented by the number of characters in the just processed field 276A, the output pointer is restored to be at the beginning of the output area 262A, or at the beginning of the field to put on or the printer, the printer counter is set 263A, the address of the first character in the field is picked up 403C; if the printer is busy 262B, the system waits 3024. If not, the next character is output to the printer 262C; the character counter is decremented 530A, it is compared to zero to see if all characters for that field have been output 2221A, if not the system outputs the next character to the printer 403C, if it is the system increments the field number 541A sets up the next field in the appropriate registers 542A and waits for a keyboard entry 3000.

Sheet 4 of FIG. 24 shows the next field logic that increments the display format register sequencer 276 and the master format register sequencer 274.

The first operation gets the display format address (display field number latch) 530A, and looks at the first byte, the format type 900A. The system compares the selected instruction to the different types of instructions, if it is a look up 900B, that disk function is performed, and the system returns to the next display format 202A. If the instruction is not a look up, the systems checks to see if the instruction code is less than thirty-two 900C indicating that another disk function is associated with the instruction, and if it is 201A the four bytes of master format are latched and the disk write at the end of the field is enabled 202A. This is one of three exits from the next field sequence.

The system checks again for a look up (because some loops reenter the system here) 900D, and if there is no disk operation, the system latches the four bytes of master field in the master ASR data in 201D. If the instruction code is less than four 900E, this indicates a field that is entered from the keyboard or is input from a periferal drive device. If it is, the lower two bits of format are altered to indicate a get instruction 3025 and the format is stored in the ASR data out latch 900F which serves as an instruction register. The print flag is reset 266A, the display sequencer is incremented, the display displacement from the latch 541B is incremented, incrementing the field number in the counter 530A, comparing the number of characters in the field, to the counter and the high and low order address counters are incremented. The exit from this sequence occurs when the return key is typed on the keyboard 265B and initiates entry of data into a field from the keyboard on one character at a time, until as many characters have been typed as are permitted in the field.

If the instruction is less than 32 or greater than 4 900E, it is of a type that performs calculation on data, outputs to a periferal device, or performs an operation on data. The associated master fields are checked one at a time to see if they are horizontal—alpha or vertical—numeris, format. Many other characteristics can be checked for at the time, e.g. number of decimal places. If the format is horizontal 401A, the character is output to the disk as it comes into the field 100C. The horizontal flag is set so that all characters in the field will be so processed. If the master field format is vertical 401B, the vertical flag is set 100E for processing the remainder of the characters in the field. At the time the sequence ends, the system checks to see if an instruction is of the type to output a character to a periferal device, or if there is an operation to be performed on the data 202B.

Sheet 5 of FIG. 23 shows the disk look up section of the system. It starts with entry from the keyboard, 3000A or the next field in the display format. There is key that points to a record of information, and a record that contains data. Both the key and the record are formatted by the master format information. The key master field is interrogated to see if there are spaces from the beginning of the line or from the previous entry on the line on the terminal display 402B. If there are spaces, the output periferal device counter is incremented and spaces are output 3026. Then, or if there are no spaces, the key master field is interrogated to see if there are line feeds from the present location in the CRT or printer 403B, if there are, the system puts out as many line feeds as are indiated 3028. Then, or if there are no line feeds, the system will find the look up, since the key field always preceeds the look up instruction in the format 401C.

The system then interrogates the master format ASR data in latch to determine the length of the key 404A. It compares the key to an existing sorted key file 3029, if the key is not greater than any stored, it must compare the new key to the file of existing keys to see if it already exists in the find sequence. If the key is unique, the system picks up the next address, and finds an area in the key file that is not currently used, 3030, it zeros the space flag for that location 3031, sets a pointer to the end of the file where the new record is going to be stored 3032, it looks up the unsorted file keys 3033, sets up the number of sectors per track and number of records per sector that record will consume 3034 and checks to see if this is the first record in which case it stores the address in the displacement field 3035 and checks to see if the end of sorted key file indicator is on 3036; if it is, the system initiates the not find routine 3037; if it is not, it initiates the find routine 3038.

When the find routine 3038 is activated a key is be compared to all or some subset of all the keys in the system. If there is no match 3039 the not find routine is activated 3037, a new record is created 3050 and the new key is stored in the key file.

The find sequence 3038 looks at the number of characters allocated as a key and checks to see if the key is on the file, the keys are compared to see if they are equal 3040. If they are not equal, the system checks to see if the end of the track has been found 3041. If it is the end of the track, a new track is read in 3042, then if or if it is not the end of the track, the next key on the file is checked for space 3039.

When the keyboard entered key is equal to a key on the key file, data is moved into the data field register 100G, the record or a series of records is then in the RAM 100 area. The display format field number that indicates from where the system will proceed is returned to the latch used to load the display ASR data out 3043 for continuation of operations 3044. The master field format is checked in the master ASR data in 3045 to see if a numeric field exists and if so how many characters are of a packed format 3046; if they are packed, the characters are unpacked and put in the data field register along with characters stored unpacked. The system then checks for listing records 3047, and moves onto the next operation pointed to by the find field 3048. Data is output one character at a time from the data field register 100.

The not find sequence is initiated when a key is not on the file 3051, i.e. when it has looked all the way through the key file. The system checks to see whether the record is blank 3052, if so it enters the record in the regular manner 3050, if it is not blank, the system checks to see if it is an extended record 3053 and if so sets the first character of the key to 01 3054, then in any case, the new key is moved into the key area of the disk 3055; the pointers to the key address and data address are incremented 3056 and saved along with the key 3057. The data record is read in off the disk 3058.

There has been described novel apparatus and techniques for processing data in the manner of a computer operable by a relatively unskilled person who need not know computer programming while producing the results of a more complex and costly digital computer that must be programmed by a skilled computer programmer. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. In a data processing system having input means for receiving digital data to be processed and output means for displaying processed digital data an improved control unit comprising, random access digital storage means comprising a linearly arranged plurality of sequential storage locations of variable length free of fixed word boundaries coupled to said input means for receiving, linearly storing and accepting operations upon, a sequence of variable length strings of digital data signals, a source of data format indicators including string format indicators each including a field signal identifying the boundary location of at least one of said strings of said digital data signals in said random access digital storage means, the length thereof and at least one other attribute of said string and process format indicators each including an operation signal identifying an operation to be performed in connection with manipulating said strings of digital data signals, said string format indicators and said process format indicators, at least one string active status register means for identifying by pointing to at least one of said string format indicators and at least one process active status register means for identifying by pointing to at least one of said process format indicators, central processing means including control means for manipulating digital data signals and said string and process format indicators in accordance with said operation signals, said control means coupled to said random access digital storage means, and string and processing active status register means and said source of data format indicators and responsive to said field signals and said operation signals for effecting said manipulating at least some of which is entirely outside said control means and in said random access digital data storage means of strings of said digital data signals, said string format indicators and said process format indicators characteristics of said strings being designated by identifying ones of said field signals, in accordance with said operation signals involving at least one of arithmetic combination, logical combination, compare and data repositioning, said control means also coupled to said input means and said output means and being responsive to said string format indicators and said process format indicators for controlling the entering of said strings of digital data signals from said input means to said random access digital storage means and exiting of stored digital data signals from said random access digital storage means to said output means, and means for coupling said random access digital storage means to said output means.

2. An improved control unit in accordance with claim 1 wherein said random access digital storage means includes flag signal storage means for storing an input flag signal and an output flag signal for each string as the string enters said random access digital storage means, and means responsive to input and output flag signals stored in said flag signal storage means for accepting and displaying respectively the associated string.

3. An improved control unit in accordance with claim 1 and further comprising, buffer memory means for storing fixed length data format segments including both said field signals and said operation signals, said string active status register means and said process active status register means coupling said field signals and said operation signals to said buffer memory means, and register location and origin decoding means coupled to said buffer memory means and said string active status register means and said process active status register means for providing buffer address and origin signals identifying the location of said fixed length data format segments in said buffer memory means.

4. An improved control unit in accordance with claim 1 wherein said process active status register means comprises an ASR data-out register for storing signals representative of digital data signals in said random access memory digital storage means for transfer to said output means, and said string active status register means comprises an ASR field register for storing signals representative of digital data signals stored in said random access digital storage means for manipulation in said random access digital storage means, and an ASR data-in register for storing signals representative of digital data signals transferred from said input means to said random access digital storage means, and further comprising display format register sequencer means coupled to said ASR data-out register for controlling the transfer of signals from said random access digital storage means to said output, master field register sequencer means coupled to said ASR field register for controlling the processing of said field signals, and master format register sequencing means for controlling the flow of digital data signals into said ASR data-in register.

* * * * *

UNITED STATES PATENT AND TRADEMARK OFFICE
CERTIFICATE OF CORRECTION

PATENT NO. :   4,433,377

DATED      :   February 21, 1984

INVENTOR(S) :  Mary S. Eustis; Augustus W. Eustis

It is certified that error appears in the above-identified patent and that said Letters Patent is hereby corrected as shown below:

At the top of sheets 1-19 of the drawings "of 19" should read -- of 25 -- and sheets 1-6 of Fig. 23 should be included in the drawings.

Signed and Sealed this

Thirtieth Day of October 1984

[SEAL]

Attest:

GERALD J. MOSSINGHOFF

Attesting Officer     Commissioner of Patents and Trademarks

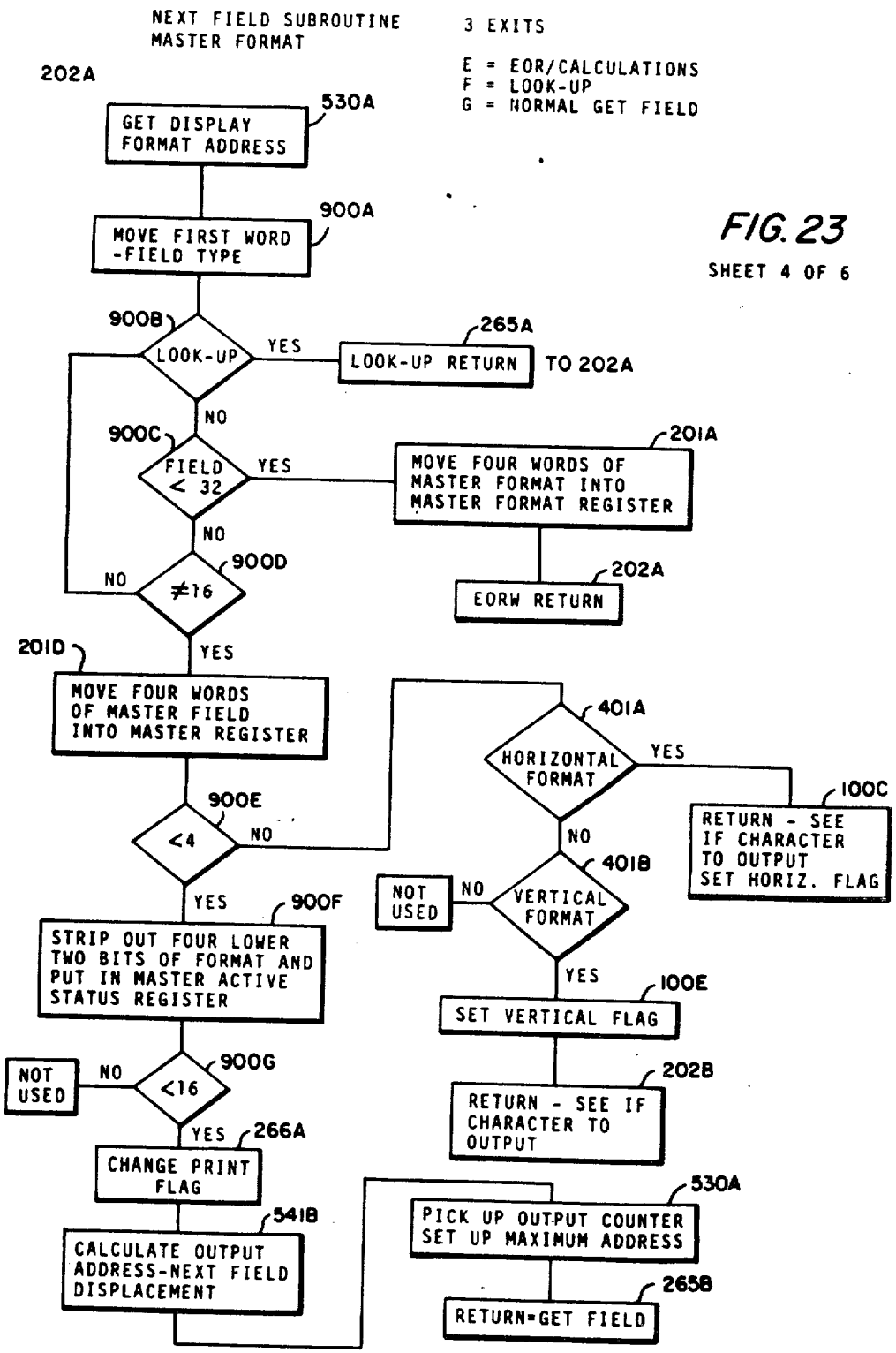

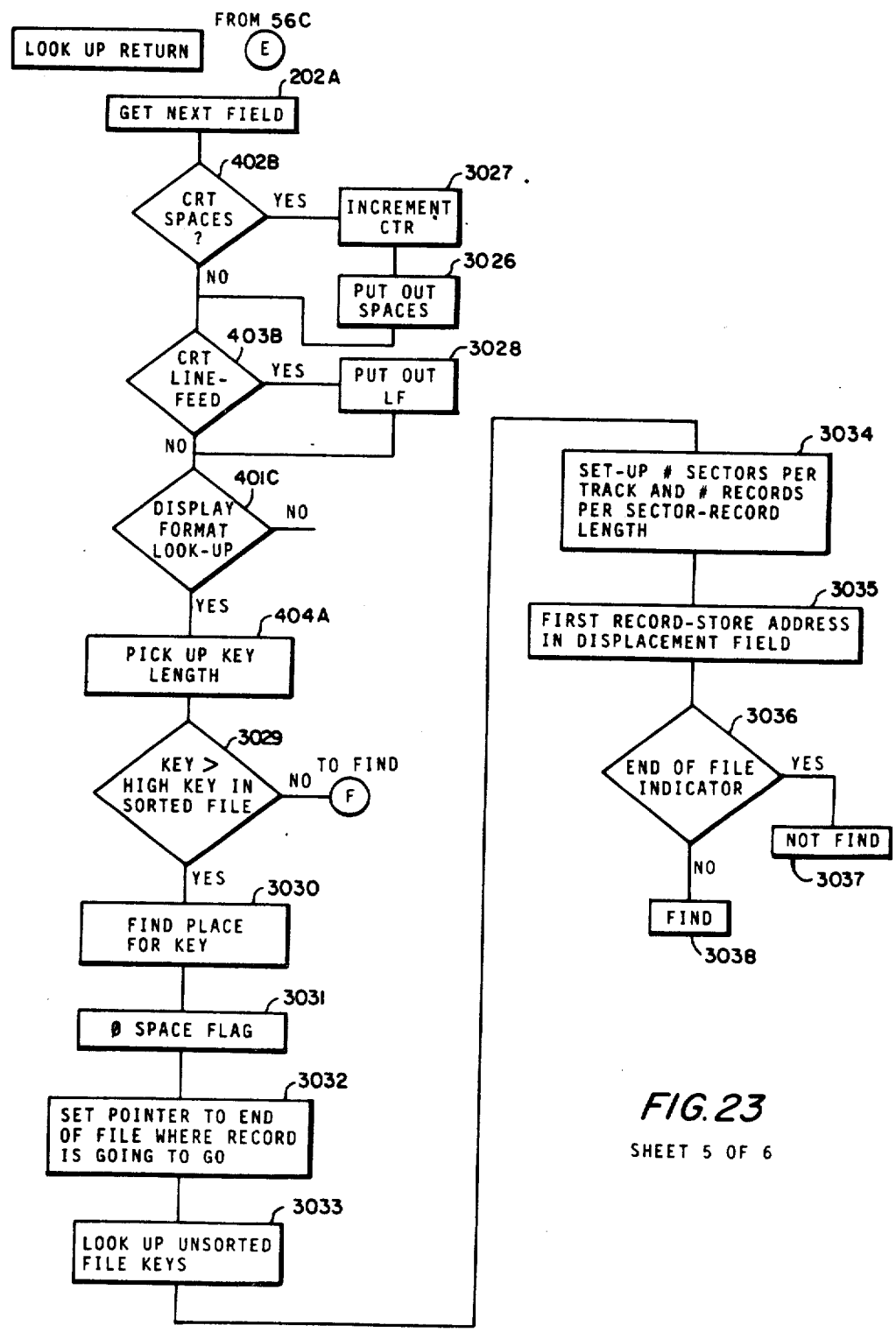

SHEET 6 OF 6